US009183111B2

(12) United States Patent
Nethercutt

(10) Patent No.: US 9,183,111 B2
(45) Date of Patent: Nov. 10, 2015

(54) METHODS AND COMPUTER PROGRAM PRODUCTS FOR COLLECTING STORAGE RESOURCE PERFORMANCE DATA USING FILE SYSTEM HOOKS

(75) Inventor: Glenn Nethercutt, Raleigh, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 447 days.

(21) Appl. No.: 13/467,375

(22) Filed: May 9, 2012

(65) Prior Publication Data

US 2012/0290718 A1    Nov. 15, 2012

Related U.S. Application Data

(60) Provisional application No. 61/484,391, filed on May 10, 2011.

(51) Int. Cl.
| | | |
|---|---|---|
| *G06F 15/173* | (2006.01) | |
| *G06F 11/34* | (2006.01) | |
| *G06F 9/45* | (2006.01) | |
| *G06F 9/44* | (2006.01) | |
| *G06F 9/445* | (2006.01) | |
| *G06F 11/30* | (2006.01) | |

(52) U.S. Cl.
CPC .............. *G06F 11/3485* (2013.01); *G06F 8/41* (2013.01); *G06F 9/443* (2013.01); *G06F 9/44521* (2013.01); *G06F 11/3006* (2013.01); *G06F 11/3093* (2013.01); *G06F 11/3409* (2013.01); *G06F 11/3476* (2013.01)

(58) Field of Classification Search
CPC ........ G06F 9/44521; G06F 9/443; G06F 8/41
USPC .................................. 719/330; 709/224–227
See application file for complete search history.

(56) References Cited

U.S. PATENT DOCUMENTS 5,671,417 A * 9/1997 Miclette et al. ............... 717/130
6,662,359 B1 * 12/2003 Berry et al. ................... 717/130

(Continued)

OTHER PUBLICATIONS

Trie [online], Sep. 18, 2010 [retrieved on Dec. 21, 2010]. Retrieved from the Internet: <http://en.wikipedia.org/w/index.php?title=Trie&oldid=385495914>.

(Continued)

*Primary Examiner* — Chirag R Patel
(74) *Attorney, Agent, or Firm* — Henry Gabryjelski; Kate Drakos; Micky Minhas

(57) ABSTRACT

Provided are methods and computer program products for collecting storage resource performance data using file system hooks. Methods may include determining a location for a function dispatch table, and modifying the function dispatch table to redirect a request for an operation. In response to a received request for the operation, an intent to perform the operation is recorded to estimate an operational queue length, and data associated with the operation is recorded in a hash table. In response to recording data associated with the operation, a function corresponding to the operation to perform the operation is invoked. Elapsed time and storage size is recorded.

20 Claims, 18 Drawing Sheets

(56) References Cited

U.S. PATENT DOCUMENTS

| | | | |
|---|---|---|---|
| 7,032,096 B2* | 4/2006 | Haas et al. | 711/216 |
| 7,526,502 B2* | 4/2009 | Hall et al. | 1/1 |
| 8,397,242 B1* | 3/2013 | Conover | 719/313 |
| 8,416,793 B2* | 4/2013 | Jones | 370/412 |
| 8,677,492 B2* | 3/2014 | Rusakov | 726/24 |
| 2002/0108107 A1* | 8/2002 | Darnell et al. | 717/153 |
| 2003/0061362 A1* | 3/2003 | Qiu et al. | 709/229 |
| 2004/0040029 A1* | 2/2004 | Debbabi et al. | 719/315 |
| 2006/0179087 A1* | 8/2006 | Fujii et al. | 707/205 |
| 2006/0179441 A1* | 8/2006 | Sigurdsson et al. | 719/330 |
| 2008/0282260 A1* | 11/2008 | Bozza et al. | 719/315 |

OTHER PUBLICATIONS

Suffix tree [online], Aug. 29, 2010 [retrieved on Dec. 21, 2010]. Retrieved from the Internet: <http://en.wikipedia.org/w/index.php?title:=Suffix_tree&oldid=381775612>.

Levenshtein distance [online], Sep. 13, 2010 [retrieved on Dec. 21, 2010]. Retrieved from the Internet: <http://en.wikipedia.org/w/index.php?title=Levenshtein_distance&oldid=384505495>.

Optimizing Levenshtein distance algorithm [online], May 27, 2010 [retrieved on Dec. 21, 2010]. Retrieved from the Internet: <http://stackoverflow.com/questions/2918771/optimizing-levenshtein-distance-algorithm>.

* cited by examiner

METHODS AND COMPUTER PROGRAM PRODUCTS FOR COLLECTING STORAGE RESOURCE PERFORMANCE DATA USING FILE SYSTEM HOOKS

RELATED APPLICATIONS

This non-provisional patent application claims priority to U.S. Provisional Application No. 61/484,391, filed May 10, 2011 and entitled Methods and Computer Program Products for Collecting Storage Resource Performance Data Using File System Hooks, the disclosure of which is hereby incorporated herein by reference as if set forth fully herein

FIELD OF INVENTION

The present invention relates to computer networks and, more particularly, to network performance monitoring methods, devices, and computer program products.

BACKGROUND

The growing presence of computer networks such as intranets and extranets has brought about the development of applications in e-commerce, education, manufacturing, and other areas. Organizations increasingly rely on such applications to carry out their business, production, or other objectives, and devote considerable resources to ensuring that the applications perform as expected. To this end, various application management, monitoring, and analysis techniques have been developed.

One approach for managing an application involves monitoring the application, generating data regarding application performance, and analyzing the data to determine application health. Some system management products analyze a large number of data streams to try to determine a normal and abnormal application state. Large numbers of data streams are often analyzed because the system management products may not have a semantic understanding of the data being analyzed. Accordingly, when an unhealthy application state occurs, many data streams may have abnormal data values because the data streams are causally related to one another. Because the system management products may lack a semantic understanding of the data, they may not be able to assist the user in determining either the ultimate source or cause of a problem. Additionally, these application management systems may not know whether a change in data indicates an application is actually unhealthy or not.

Current application management approaches may include monitoring techniques such as deep packet inspection (DPI), which may be performed as a packet passes an inspection point and may include collecting statistical information, among others. Such monitoring techniques can be data-intensive and may be ineffective in providing substantively real time health information regarding network applications. Additionally, packet trace information may be lost and application-specific code may be required.

Embodiments of the present invention are, therefore, directed towards solving these and other related problems.

SUMMARY

Some embodiments of the present invention are directed to methods for collecting storage resource performance data. Such methods may include determining a location for a function dispatch table that is configured to store pointers to read and/or write functions corresponding to a file system, modifying the function dispatch table to redirect a request for an operation, recording, responsive to a received request for the operation, an intent to perform the operation to estimate an operational queue length and recording, responsive to the received request for the operation, data associated with the operation in a hash table. Some methods may include invoking, responsive to recording data associated with the operation, a function corresponding to the operation to perform the operation and recording elapsed time and storage size.

As disclosed herein, any one or ones of operations corresponding to methods, systems and/or computer program products may be performed using at least one data processor.

In some embodiments, determining the location comprises resolving a kernel object symbol to extract the location. Some embodiments provide that the function dispatch table comprises a dynamically loaded vnode function dispatch table. In some embodiments, the operation comprises a read and/or a write operation. Some embodiments provide that the operation corresponds to memory mapped inputs and/or outputs.

In some embodiments, modifying the function dispatch table to redirect a request for the operation comprises hooking the file system read and/or write functions.

Some embodiments provide that recording the intent to perform the operation comprises using a first set of file system hook functions. In some embodiments, the operation includes calculating the operational queue length.

In some embodiments, after recording the data associated with the operation in the hash table, the data recorded in the hash table is indexed by a file system type and/or by a mount point name Some embodiments provide that indexing the data recorded in the hash table comprises primarily indexing the data by the file system type and secondarily indexing the data by the mount point name. Some embodiments provide that invoking the function corresponding to the operation to perform the operation comprises performing a specific action corresponding to the operation.

Some embodiments include modifying the function dispatch table to redirect a notification of completion of the operation. In some embodiments, recording elapsed time and storage size is performed using a second set of file system hook functions and elapsed time and storage size is recorded responsive to a received notification of completion of the operation.

Some embodiments of the present invention include a computer program product that includes a non-transitory computer readable storage medium having computer readable program code embodied therein. The computer readable program code may include computer readable program code that is configured to modify a function dispatch table that is configured to store pointers to read and/or write functions corresponding to a file system to redirect a request for a read and/or a write operation, computer readable program code that is configured to record an intent to perform the read and/or write operation to estimate an operational queue length in response to a received request for the read and/or write operation, and computer readable program code that is configured to record data associated with the operation in a hash table in response to the received request for the read and/or write operation. Embodiments may further include computer readable code that is configured to invoke a function corresponding to the read and/or write operation to perform the read and/or write operation and recording an elapsed time and a storage size.

Some embodiments may include computer readable program code that is configured to modify the function dispatch table to redirect a notification of completion of the read and/or write operation. Some embodiments provide that recording elapsed time and storage size is performed using a second set of file system hook functions. In some embodiments, elapsed time and storage size is recorded responsive to a received notification of completion of the read and/or write operation.

In some embodiments, the location is determined by resolving a kernel object symbol to extract the location. Some embodiments provide that the function dispatch table includes a dynamically loaded vnode function dispatch table. In some embodiments, the read and/or write operation corresponds to memory mapped inputs and/or outputs.

Some embodiments provide that the function dispatch table is modified to redirect the request for the read and/or write operation by hooking file system read and/or write functions. In some embodiments, after the data associated with the read and/or write operation is recorded in the hash table, the data recorded in the hash table is indexed by a file system type and/or by a mount point name. Some embodiments provide that the data recorded in the hash table is indexed by primarily indexing the data by the file system type and secondarily indexing the data by the mount point name.

In some embodiments, the intent to perform the read and/or write operation is performed using a first set of file system hook functions, and the particular read and/or write operation includes calculating the operational queue length.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

FIG. 3 is a block diagram illustrating operations and/or functions of a collector application as described above regarding FIG. 1a.

DETAILED DESCRIPTION

Figure 1A:
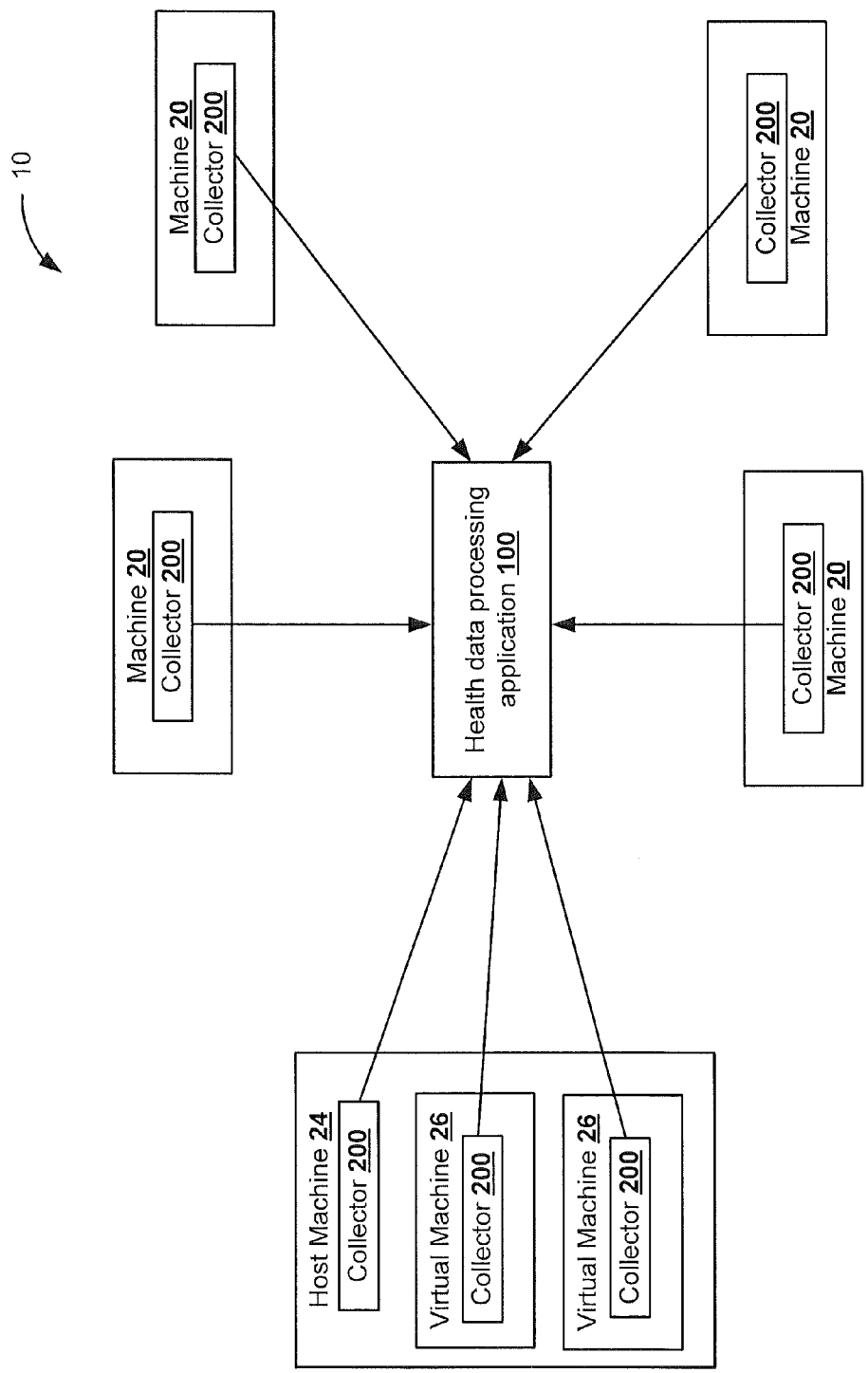
FIGS. 1a-1d are block diagrams illustrating exemplary networks in which operations for monitoring network application performance may be performed according to some embodiments of the present invention.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail. While various modifications and alternative forms of the embodiments described herein may be made, specific embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices), and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process, such that the instructions, which execute on the computer or other programmable apparatus, provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a non-transitory computer-usable or computer-readable storage medium having computer-usable or computer-readable program code embodied in the medium for use by or in connection with an instruction execution system. In the context of this document, a non-transitory computer-usable or computer-readable medium may be any medium that can contain, store, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Computer program code for carrying out operations of data processing systems discussed herein may be written in a high-level programming language, such as C, C++, or Java, for development convenience. In addition, computer program code for carrying out operations of exemplary embodiments may also be written in other programming languages, such as, but not limited to, interpreted languages. Some modules or routines may be written in assembly language or even microcode to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Reference is made to FIGS. 1*a*-1*d*, which are block diagrams illustrating exemplary networks in which operations for monitoring and reporting network application performance may be performed according to some embodiments of the present invention.

Computing Network

Referring to FIG. 1*a*, a network 10 according to some embodiments herein may include a health data processing application 100 and a plurality of network devices 20, 24, and 26 that may each include respective collector applications 200. It is to be understood that a "network device" as discussed herein may include physical (as opposed to virtual) machines 20; host machines 24, each of which may be a physical machine on which one or more virtual machines may execute; and/or virtual machines 26 executing on host machines 24. It is to be further understood that an "application" as discussed herein refers to an instance of executable software operable to execute on respective ones of the network devices. The terms "application" and "network application" may be used interchangeably herein, regardless of whether the referenced application is operable to access network resources.

Collector applications 200 may collect data related to the performance of network applications executing on respective network devices. For instance, a collector application executing on a physical machine may collect performance data related to network applications executing on that physical machine. A collector application executing on a host machine and external to any virtual machines hosted by that host machine may collect performance data related to network applications executing on that host machine, while a collector application executing on a virtual machine may collect performance data related to network applications executing within that virtual machine.

The health data processing application 100 may be on a network device that exists within the network 10 or on an external device that is coupled to the network 10. Accordingly, in some embodiments, the network device on which the health data processing application 100 may reside may be one of the plurality of machines 20 or 24 or virtual machines 26. Communications between various ones of the network devices may be accomplished using one or more communications and/or network protocols that may provide a set of standard rules for data representation, signaling, authentication and/or error detection that may be used to send information over communications channels therebetween. In some embodiments, exemplary network protocols may include HTTP, TDS, and/or LDAP, among others.

Figure 1B:
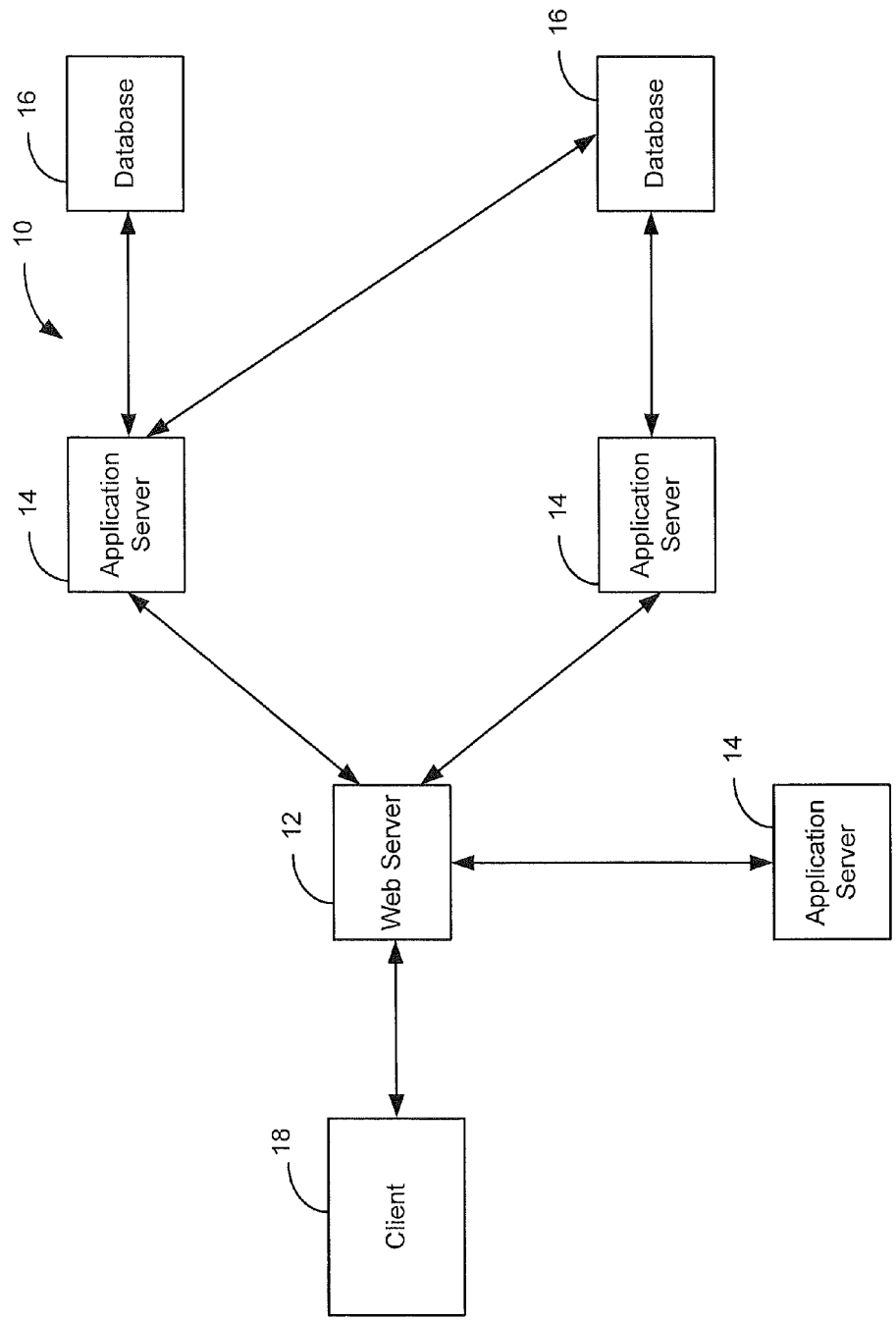

Referring to FIG. 1b, an exemplary network 10 may include a web server 12, one or more application servers 14 and one or more database servers 16. Although not illustrated, a network 10 as used herein may include directory servers, security servers, and/or transaction monitors, among others. The web server 12 may be a computer and/or a computer program that is responsible for accepting HTTP requests from clients 18 (e.g., user agents such as web browsers) and serving them HTTP responses along with optional data content, which may be, for example, web pages such as HTML documents and linked objects (images, etc.). An application server 14 may include a service, hardware, and/or software framework that may be operable to provide one or more programming applications to clients in a network. Application servers 14 may be coupled to one or more web servers 12, database servers 16, and/or other application servers 14, among others. Some embodiments provide that a database server 16 may include a computer and/or a computer program that provides database services to other computer programs and/or computers as may be defined, for example by a client-server model, among others. In some embodiments, database management systems may provide database server functionality.

Some embodiments provide that the collector applications 200 and the health data processing application 100 described above with respect to FIG. 1a may reside on ones of the web server(s) 12, application servers 14 and/or database servers 16, among others. In some embodiments, the health data processing application 100 may reside in a dedicated computing device that is coupled to the network 10. The collector applications 200 may reside on one, some or all of the above listed network devices and provide network application performance data to the health data processing application 100.

Computing Device

Figure 1C:
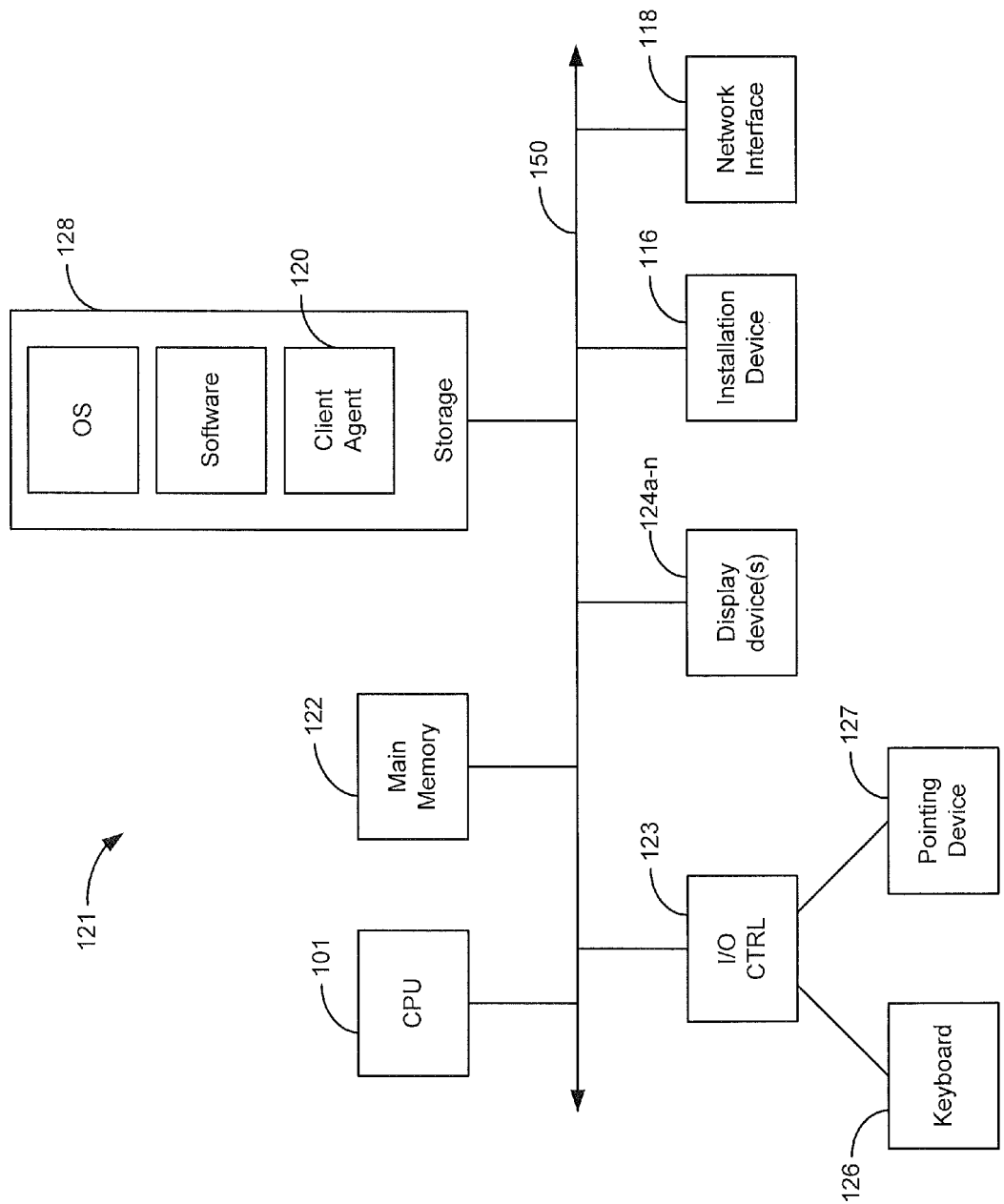
Figure 1D:
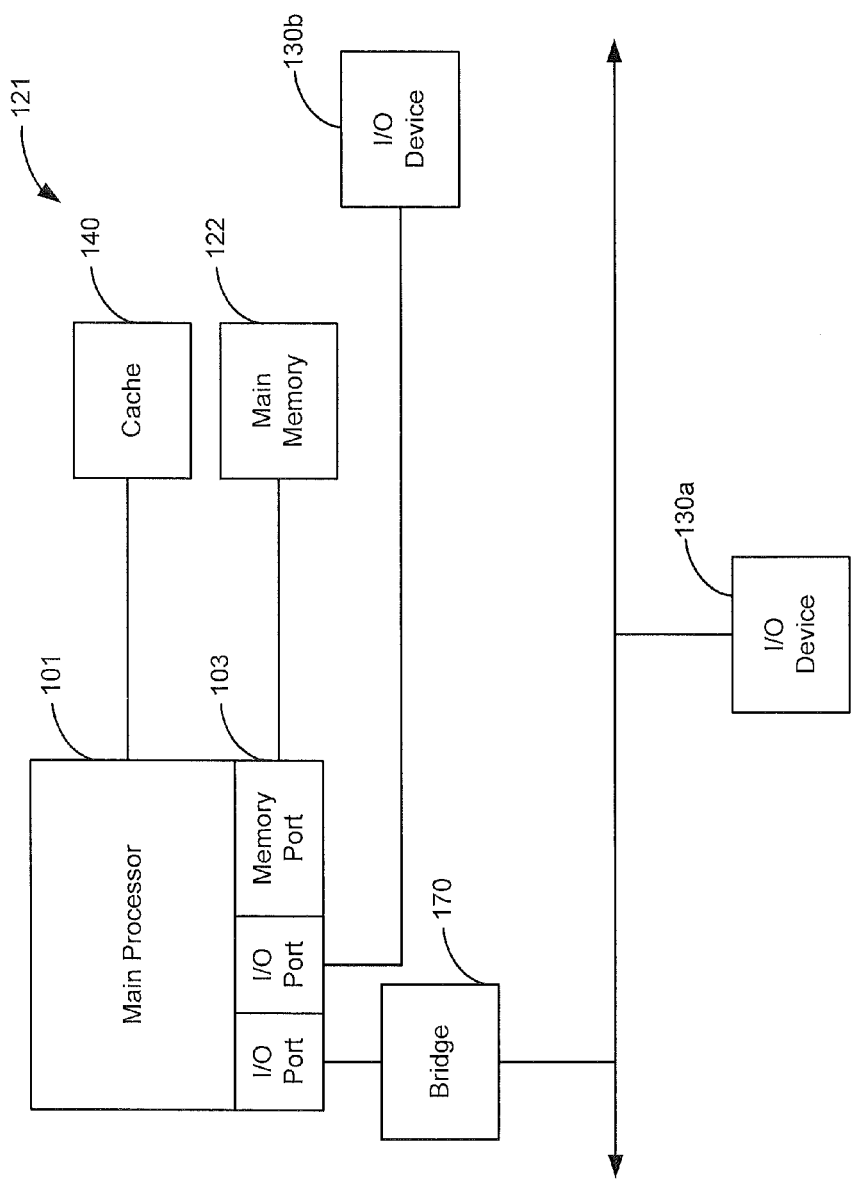

Web server(s) 12, application servers 14 and/or database servers 16 may be deployed as and/or executed on any type and form of computing device, such as a computer, network device, or appliance capable of communicating on any type and form of network and performing the operations described herein. FIGS. 1c and 1d depict block diagrams of a computing device 121 useful for practicing some embodiments described herein. Referring to FIGS. 1c and 1d, a computing device 121 may include a central processing unit 101 and a main memory unit 122. A computing device 100 may include a visual display device 124, a keyboard 126, and/or a pointing device 127, such as a mouse. Each computing device 121 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit 101 is provided by a microprocessor unit, such as: those manufactured by Intel Corporation of Mountain View, Calif.; those manufactured by Motorola Corporation of Schaumburg, Ill.; the POWER processor, those manufactured by International Business Machines of White Plains, N.Y.; and/or those manufactured by Advanced Micro Devices of Sunnyvale, Calif. The computing device 121 may be based on any of these processors, and/or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM), among others. The main memory 122 may be based on any of the above described memory chips, or any other available memory chips capable of operating as described herein. In some embodiments, the processor 101 communicates with main memory 122 via a system bus 150 (described in more detail below). In some embodiments of a computing device 121, the processor 101 may communicate directly with main memory 122 via a memory port 103. Some embodiments provide that the main memory 122 may be DRDRAM.

FIG. 1d depicts some embodiments in which the main processor 101 communicates directly with cache memory 140 via a secondary bus, sometimes referred to as a backside bus. In some other embodiments, the main processor 101 may communicate with cache memory 140 using the system bus 150. Cache memory 140 typically has a faster response time than main memory 122 and may be typically provided by SRAM, BSRAM, or EDRAM. In some embodiments, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, and/or a NuBus, among others. For embodiments in which the I/O device is a video display 124, the processor 101 may use an Advanced Graphics Port (AGP) to communicate with the display 124. FIG. 1d depicts some embodiments of a computer 100 in which the main processor 101 communicates directly with I/O device 130 via HyperTransport, Rapid I/O, or InfiniBand. FIG. 1d also depicts some embodiments in which local busses and direct communication are mixed: the processor 101 communicates with I/O device 130a using a local interconnect bus while communicating with I/O device 130b directly.

The computing device 121 may support any suitable installation device 116, such as a floppy disk drive for receiving floppy disks such as 3.5-inch, 5.25-inch disks, or ZIP disks, a CD-ROM drive, a CD-R/RW drive, a DVD-ROM drive, tape drives of various formats, USB device, hard disk drive (HDD), solid-state drive (SSD), or any other device suitable for installing software and programs such as any client agent 120, or portion thereof. The computing device 121 may further comprise a storage device 128, such as one or more hard disk drives or solid-state drives or redundant arrays of independent disks, for storing an operating system and other related software, and for storing application software programs such as any program related to the client agent 120.

Optionally, any of the installation devices 116 could also be used as the storage device 128. Additionally, the operating system and the software can be run from a bootable medium, for example, a bootable CD, such as KNOPPIX™, a bootable CD for GNU/Linux that is available as a GNU/Linux distribution from knoppix.net.

Furthermore, the computing device 121 may include a network interface 118 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., ISDN, Frame Relay, ATM), wireless connections (e.g., IEEE 802.11), or some combination of any or all of the above. The network interface 118 may comprise a built-in network adapter, network interface card, PCMCIA network card, card bus network adapter, wireless network adapter, USB network adapter, modem, or any other device suitable for interfacing the computing device 121 to any type of network capable of communication and performing the operations described herein. A wide variety of I/O devices 130a-130n may be present in the computing device 121. Input devices include keyboards, mice, trackpads, trackballs, microphones, and drawing tablets, among others. Output devices include video displays, speakers, inkjet printers, laser printers, and dye-sublimation printers, among others. The I/O devices 130 may be controlled by an I/O controller 123 as shown in FIG. 1c. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 121 may provide USB connections to receive handheld USB storage devices such USB flash drives.

In some embodiments, the computing device 121 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable, or provide for the connection and use of multiple display devices 124a-124n by the computing device 121. For example, the computing device 121 may include any type and/or form of video adapter, video card, driver, and/or library to interface, communicate, connect or otherwise use the display devices 124a-124n. In some embodiments, a video adapter may comprise multiple connectors to interface to multiple display devices 124a-124n. In some other embodiments, the computing device 121 may include multiple video adapters, with each video adapter connected to one or more of the display devices 124a-124n. In some embodiments, any portion of the operating system of the computing device 100 may be configured for using multiple displays 124a-124n. In some embodiments, one or more of the display devices 124a-124n may be provided by one or more other computing devices connected to the computing device 121, for example, via a network. Such embodiments may include any type of software designed and constructed to use another computer's display device as a second display device 124a for the computing device 121. One ordinarily skilled in the art will recognize and appreciate the various ways and embodiments that a computing device 121 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, and/or a Serial Attached small computer system interface bus, among others.

A computing device 121 of the sort depicted in FIGS. 1c and 1d may typically operate under the control of operating systems, which control scheduling of tasks and access to system resources. The computing device 121 can be running any operating system such as any of the versions of the Microsoft® Windows operating systems, any of the different releases of the Unix and Linux operating systems, any version of the Mac OS® for Macintosh computers, any embedded operating system, any real-time operating system, any open source operating system, any proprietary operating system, any operating systems for mobile computing devices, and/or any other operating system capable of running on a computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, WINDOWS 7.0, WINDOWS SERVER 2003, and/or WINDOWS SERVER 2008, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Red Hat of Raleigh, N.C., among others, or any type and/or form of a Unix operating system, among others.

In some embodiments, the computing device 121 may have different processors, operating systems, and input devices consistent with the device. For example, in one embodiment the computing device 121 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 121 can be any workstation, desktop computer, laptop, or notebook computer, server, handheld computer, mobile telephone, any other computer, or other form of computing or telecommunications device that is capable of communication and that has sufficient processor power and memory capacity to perform the operations described herein.

Architecture

Figure 2:
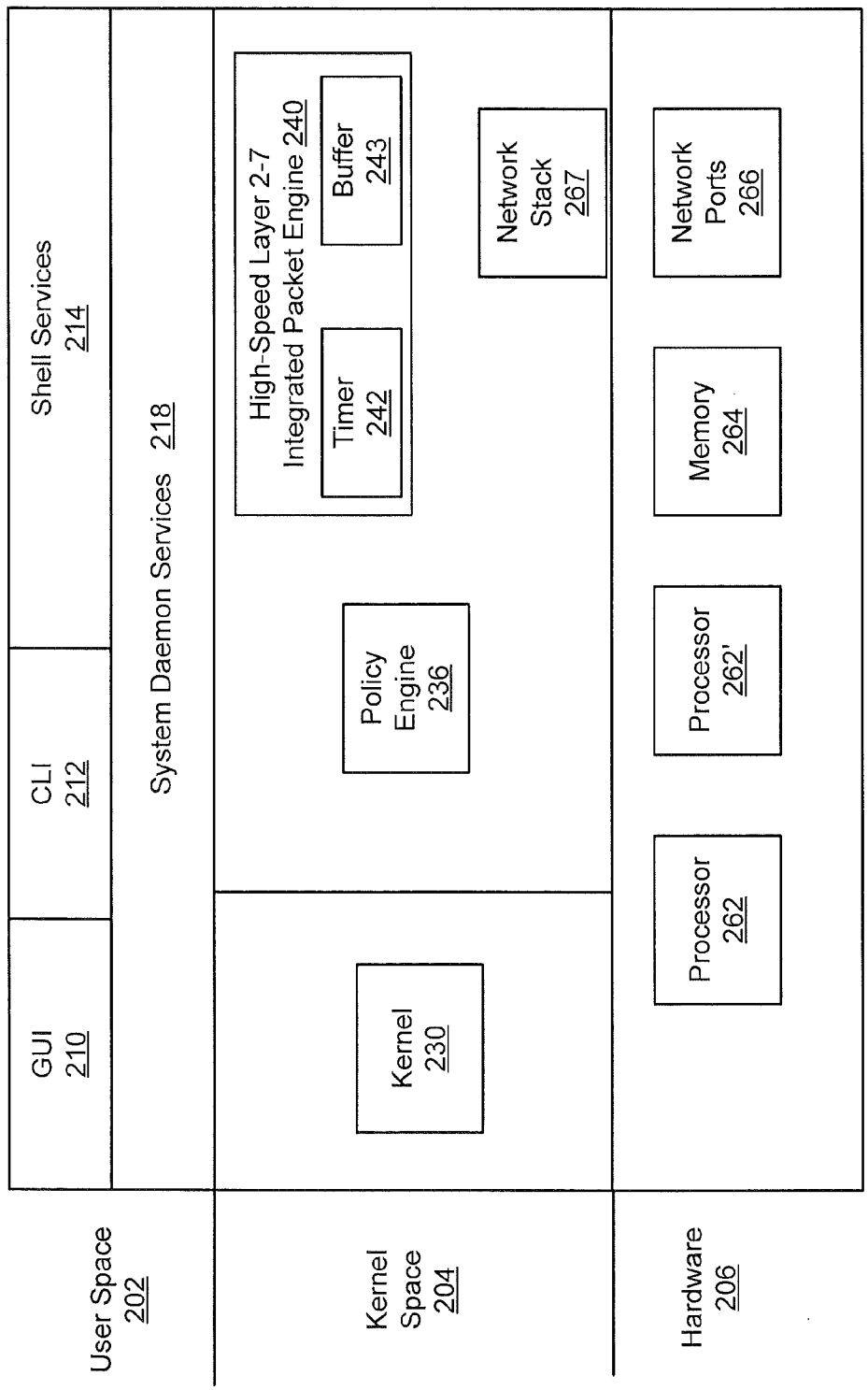
FIG. 2 is a block diagram illustrating an architecture of a computing device as discussed above regarding FIGS. 1c and 1d.

Reference is now made to FIG. 2, which is a block diagram illustrating an architecture of a computing device 121 as discussed above regarding FIGS. 1c and 1d. The architecture of the computing device 121 is provided by way of illustration only and is not intended to be limiting. The architecture of computing device 121 may include a hardware layer 206 and a software layer divided into a user space 202 and a kernel space 204.

Hardware layer 206 may provide the hardware elements upon which programs and services within kernel space 204 and user space 202 are executed. Hardware layer 206 also provides the structures and elements that allow programs and services within kernel space 204 and user space 202 to communicate data both internally and externally with respect to computing device 121. The hardware layer 206 may include a processing unit 262 for executing software programs and services, a memory 264 for storing software and data, and network ports 266 for transmitting and receiving data over a network. Additionally, the hardware layer 206 may include multiple processors for the processing unit 262. For example, in some embodiments, the computing device 121 may include a first processor 262 and a second processor 262'. In some embodiments, the processor 262 or 262' includes a multi-core processor. The processor 262 may include any of the processors 101 described above in connection with FIGS. 1c and 1d.

Although the hardware layer 206 of computing device 121 is illustrated with certain elements in FIG. 2, the hardware portions or components of computing device 121 may include any type and form of elements, hardware or software, of a computing device, such as the computing device 121 illustrated and discussed herein in conjunction with FIGS. 1c and 1d. In some embodiments, the computing device 121 may comprise a server, gateway, router, switch, bridge, or other type of computing or network device, and have any hardware and/or software elements associated therewith.

The operating system of computing device 121 allocates, manages, or otherwise segregates the available system memory into kernel space 204 and user space 202. As discussed above, in the exemplary software architecture, the operating system may be any type and/or form of various ones of different operating systems capable of running on the computing device 121 and performing the operations described herein.

The kernel space 204 may be reserved for running the kernel 230, including any device drivers, kernel extensions, and/or other kernel related software. As known to those skilled in the art, the kernel 230 is the core of the operating system, and provides access, control, and management of resources and hardware-related elements of the applications. In accordance with some embodiments of the computing device 121, the kernel space 204 also includes a number of network services or processes working in conjunction with a cache manager sometimes also referred to as the integrated cache. Additionally, some embodiments of the kernel 230 will depend on embodiments of the operating system installed, configured, or otherwise used by the device 121.

In some embodiments, the device 121 includes one network stack 267, such as a TCP/IP based stack, for communicating with a client and/or a server. In other embodiments, the device 121 may include multiple network stacks. In some embodiments, the network stack 267 includes a buffer 243 for queuing one or more network packets for transmission by the computing device 121.

As shown in FIG. 2, the kernel space 204 includes a high-speed layer 2-7 integrated packet engine 240 and a policy engine 236. Running packet engine 240 and/or policy engine 236 in kernel space 204 or kernel mode instead of the user space 202 improves the performance of each of these components, alone and in combination. Kernel operation means that packet engine 240 and/or policy engine 236 run in the core address space of the operating system of the device 121. For example, data obtained in kernel mode may not need to be passed or copied to a process or thread running in user mode, such as from a kernel level data structure to a user level data structure. In this regard, such data may be difficult to determine for purposes of network application performance monitoring. In another aspect, the number of context switches between kernel mode and user mode are also reduced. Additionally, synchronization of and communications between packet engine 240 and/or policy engine 236 can be performed more efficiently in the kernel space 204.

In some embodiments, any portion of the packet engine 240 and/or policy engine 236 may run or operate in the kernel space 204, while other portions of packet engine 240 and/or policy engine 236 may run or operate in user space 202. In some embodiments, the computing device 121 uses a kernel-level data structure providing access to any portion of one or more network packets, for example, a network packet comprising a request from a client or a response from a server. In some embodiments, the kernel-level data structure may be obtained by the packet engine 240 via a transport layer driver interface (TDI) or filter to the network stack 267. The kernel-level data structure may include any interface and/or data accessible via the kernel space 204 related to the network stack 267, network traffic, or packets received or transmitted by the network stack 267. In some embodiments, the kernel-level data structure may be used by packet engine 240 and/or policy engine 236 to perform the desired operation of the component or process. Some embodiments provide that packet engine 240 and/or policy engine 236 is running in kernel mode 204 when using the kernel-level data structure, while in some other embodiments, the packet engine 240 and/or policy engine 236 is running in user mode when using the kernel-level data structure. In some embodiments, the kernel-level data structure may be copied or passed to a second kernel-level data structure, or any desired user-level data structure.

A policy engine 236 may include, for example, an intelligent statistical engine or other programmable application(s). In some embodiments, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In some embodiments, the policy engine 236 may include any logic, rules, functions or operations to determine and provide access, control and management of objects, data or content being cached by the computing device 121 in addition to access, control and management of security, network traffic, network access, compression, and/or any other function or operation performed by the computing device 121.

High speed layer 2-7 integrated packet engine 240, also generally referred to as a packet processing engine or packet engine, is responsible for managing the kernel-level processing of packets received and transmitted by computing device 121 via network ports 266. The high speed layer 2-7 integrated packet engine 240 may include a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 may work in conjunction with policy engine 236. In particular, policy engine 236 is configured to perform functions related to traffic management such as request-level content switching and request-level cache redirection.

The high speed layer 2-7 integrated packet engine 240 includes a packet processing timer 242. In some embodiments, the packet processing timer 242 provides one or more time intervals to trigger the processing of incoming (i.e., received) or outgoing (i.e., transmitted) network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms, or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated and/or in communication with the policy engine 236 during operation. As such, any of the logic, functions, or operations of the policy engine 236 may be performed responsive to the packet processing timer 242 and/or the packet engine 240. Therefore, any of the logic, functions, and/or operations of the policy engine 236 may be performed at the granularity of time intervals provided via the packet processing timer 242, for example, at a time interval of less than or equal to 10 ms.

In contrast to kernel space 204, user space 202 is the memory area or portion of the operating system used by user mode applications or programs otherwise running in user mode. Generally, a user mode application may not access kernel space 204 directly, and instead must use service calls in order to access kernel services. As shown in FIG. 2, user space 202 of computing device 121 includes a graphical user interface (GUI) 210, a command line interface (CLI) 212, shell services 214, and daemon services 218. Using GUI 210 and/or CLI 212, a system administrator or other user may interact with and control the operation of computing device 121. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, and/or ksh type shell. The shell services 214 may include the programs, services, tasks, processes and/or executable instructions to support interaction with the computing device 121 or operating system by a user via the GUI 210 and/or CLI 212.

Daemon services 218 are programs that run continuously or in the background and handle periodic service requests received by computing device 121. In some embodiments, a daemon service may forward the requests to other programs or processes, such as another daemon service 218 as appropriate. As known to those skilled in the art, a daemon service 218 may run unattended to perform continuous and/or periodic system wide functions, such as network control, or to perform any desired task. In some embodiments, one or more daemon services 218 run in the user space 202, while in other embodiments, one or more daemon services 218 run in the kernel space.

Collector Application

Figure 3:
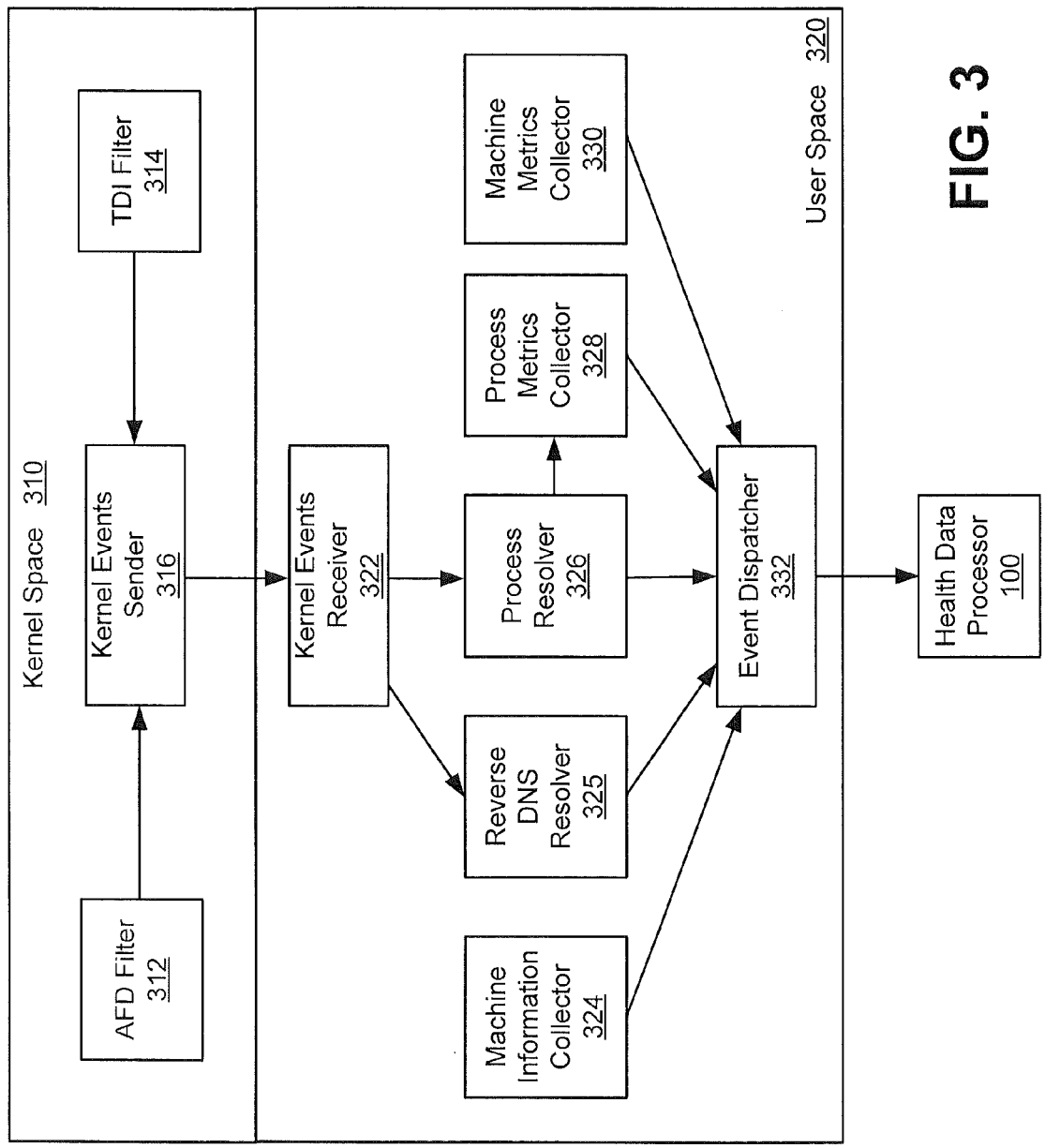

Reference is now made to FIG. 3, which is a block diagram illustrating operations and/or functions of a collector application 200 as described above regarding FIG. 1a. The collector application 200 includes a kernel space module 310 and a user space module 320. The kernel space module 310 may generally operate to intercept network activities as they occur. Some embodiments provide that the kernel space module 310 may use a kernel mode interface in the operating system, such as, for example, Microsoft Windows transport data interface (TDI). The kernel space module 310 may include a TDI filter 314 that is configured to monitor and/or intercept interactions between applications. Additionally, some embodiments provide that the kernel space module 310 may include an ancillary functions driver (AFD) filter 312 that is configured to intercept read operations and the time of their duration. Some operating systems may include a kernel mode driver other than the AFD. In this regard, operations described herein may be used with other such kernel mode drivers to intercept application operational data.

The raw data related to the occurrence of and attributes of transactions between network applications may be generally referred to as "performance data." The raw data may have value for diagnosing network application performance issues and/or for identifying and understanding the structure of the network applications. The measurements or aggregations of performance data may be generally referred to as "metrics" or "performance metrics." Performance data and the metrics generated therefrom may be temporally relevant—i.e., the performance data and the metrics may be directly related to and/or indicative of the health of the network at the time the performance data is collected. Performance data may be collected, and metrics based thereon may be generated, on a client side and/or a server side of an interaction. Some embodiments provide that performance data is collected in substantially real-time. In this context, "substantially real-time" means that performance data is collected immediately subsequent to the occurrence of the related network activity, subject to the delays inherent in the operation of the computing device and/or the network and in the method of collection. The performance data collected and/or the metrics generated may correspond to a predefined time interval. For example, a time interval may be defined according to the dynamics of the network and may include exemplary period lengths of less than 1, 1, 5, 10, 15, 20, 30, and/or 60, seconds, among others.

Exemplary client side metrics may be aggregated according to one or more applications or processes. For example, the client side metrics may be aggregated according to destination address, port number, and a local process identifier (PID). A PID may be a number used by some operating system kernels to uniquely identify a process. This number may be used as a parameter in various function calls allowing processes to be manipulated, such as adjusting the process's priority and/or terminating the process. In this manner, multiple connections from the same application or process to the same remote service may be aggregated. As discussed in more detail with respect to FIGS. 10-11, client side metrics for processes that work together as a single logical unit may also be aggregated into process pools.

Similarly, server side metrics may be aggregated according to the same application or service regardless of the client. For example, some embodiments provide that server side metrics may be aggregated according to local address, port number, and PID. Respective ones of the client side and server side metrics may be collected from the kernel space and/or user space.

The kernel space module 310 may include a kernel events sender 316 that is configured to receive performance data from the AFD filter 312 and/or the TDI filter 314, and generate metrics based on the performance data for receipt by a kernel events receiver 322 in the user space module 320. In the user space module 320, metrics data received by the kernel event receiver 322 may be processed by a reverse domain name system (DNS) resolver 325 to map an observed network address to a more user-friendly DNS name. Additionally, metrics data received by the kernel events receiver 322 may be used by a process resolver 326 to determine the processes and/or applications corresponding to the collected kernel metrics data.

The user space module 320 may include a machine information collector 324 that is operable to determine static machine information, such as, for example, CPU speed, memory capacity, and/or operating system version, among others. As the performance data is collected corresponding to applications and/or processes, the machine information may be non-correlative relative to the applications and/or processes. The user space module 320 may include a process data collector 328 that collects data corresponding to the processes and/or applications determined in the process resolver 326. A machine performance data collector 330 may collect machine specific performance data. Examples of machine data may include information about resource utilization such as the amount of memory in use and/or the percentage of available CPU time consumed. The user space module 320 may include an event dispatcher 332 that is configured to receive the machine information, resolved DNS information, process identification, process data, and/or machine data, and to generate events incorporating the aggregated metrics data for dispatch to a health data processor application 100 that is operable to receive aggregated metrics data from multiple collectors 200.

Some embodiments provide that the performance data collected and/or metrics generated may be diagnostically equivalent and, thus, may be aggregated into a single event. The identification process may depend on which application initiates a network connection and which end of the connection is represented by a current collector application host.

Figure 4:
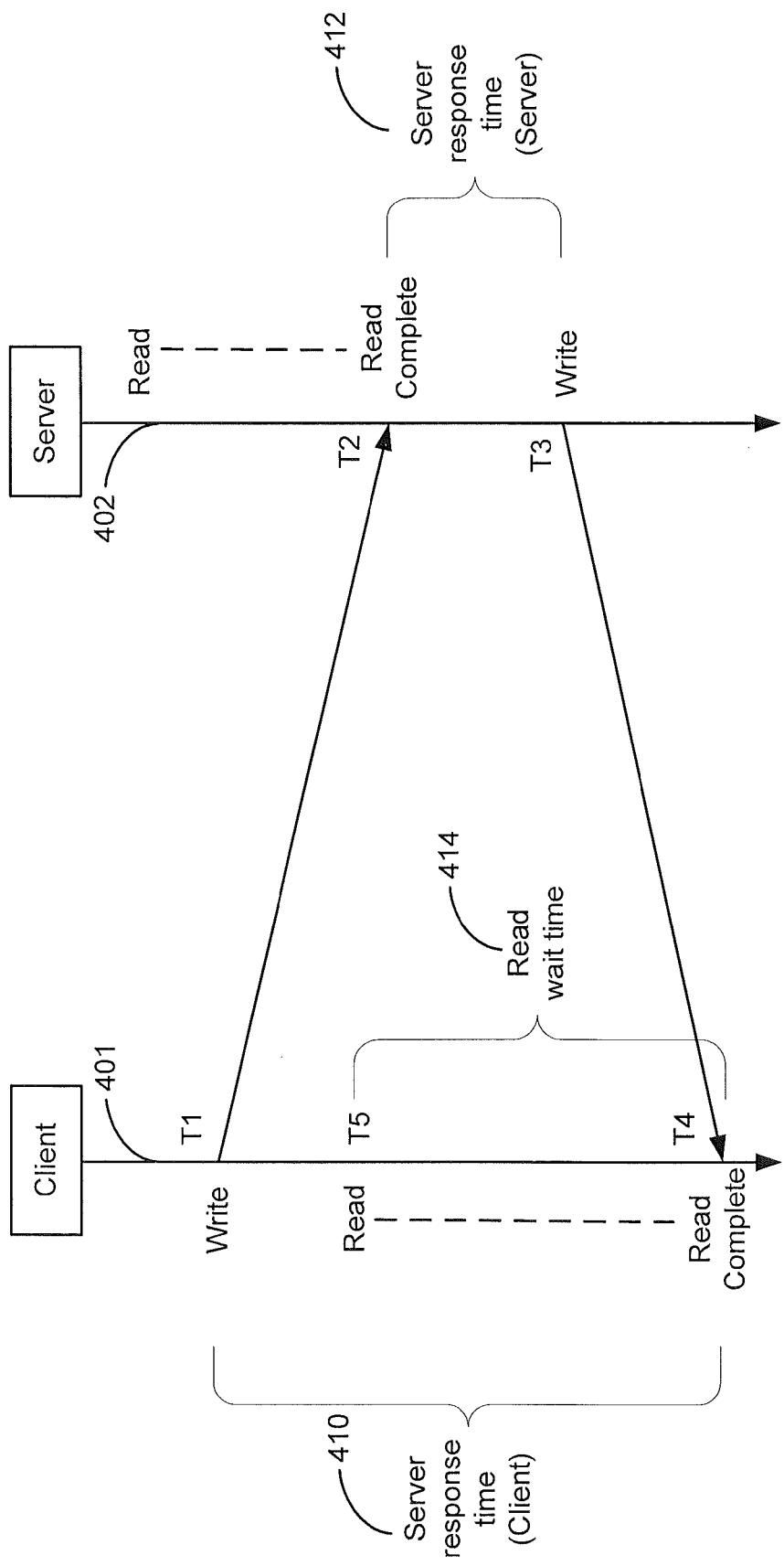
FIG. 4 is a diagram illustrating determining a read wait time corresponding to a user transaction according to some embodiments of the present invention.

Kernel level metrics may generally include data corresponding to read operations that are in progress. For example, reference is now made to FIG. 4, which is a diagram illustrating determining a read wait time corresponding to a user transaction according to some embodiments of the present invention. A user transaction between a client 401 and a server 402 are initiated when the client 401 sends a write request at time T1 to the server 402. The server 402 completes reading the request at time T2 and responds to the request at time T3 and the client 401 receives the response from the server 402 at time T4. A kernel metric that may be determined is the amount of time spent between beginning a read operation and completing the read operation. In this regard, client measured server response time 410 is the elapsed time between when the request is sent (T1) and when a response to the request is read (T4) by the client. Accordingly, the client measured server response time 410 may be determined as T4-T1. The server 402 may determine a server measured server response time 412 that is the elapsed time between when the request is read (T2) by the server 402 and when the response to the request is sent (T3) by the server 402 to the client 401. Accordingly, the server measured server response time 412 may be determined as T3-T2.

As the application response is measured in terms of inbound and outbound packets, the application response time may be determined in an application agnostic manner.

Additionally, another metric that may be determined is the read wait time 414, which is the elapsed time between when the client 401 is ready to read a response to the request T5 and when the response to the request is actually read T4. In some embodiments, the read wait time may represent a portion of the client measured server response time 410 that may be improved upon by improving performance of the server 402. Further, the difference between the client measured server response time 410 and the server measured server response time 412 may be used to determine the total transmission time of the data between the client 401 and the server 402. Some embodiments provide that the values may not be determined until a read completes. In this regard, pending reads may not be included in this metric. Further, as a practical matter, higher and/or increasing read time metrics discussed above may be indicative of a slow and/or poor performing server 402 and/or protocol where at least some messages originate unsolicited at the server 402.

Other read metrics that may be determined include the number of pending reads. For example, the number of read operations that have begun but are not yet completed may be used to detect high concurrency. In this regard, high and/or increasing numbers of pending read operations may indicate that a server 402 is not keeping up with the workload. Some embodiments provide that the total number of reads may include reads that began at a time before the most recent aggregated time period.

Additionally, some embodiments provide that the number of reads that were completed during the last time period may be determined. An average of read wait time per read may be generated by dividing the total read wait time, corresponding to a sum of all of the T4-T5 values during the time period, by the number of completed reads in that period.

In some embodiments, the number of stalled reads may be determined as the number of pending reads that began earlier than a predefined threshold. For example, a predefined threshold of 60 seconds may provide that the number of pending read operations that began more than 60 seconds ago are identified as stalled read operations. Typically, any value greater than zero may be undesirable and/or may be indicative of a server-initiated protocol. Some embodiments may also determine the number of bytes sent/received on a connection.

The number of completed responses may be estimated as the number of times a client-to-server message (commonly interpreted as a request) was followed by a server-to-client message (commonly interpreted as a response). Some embodiments provide that this may be measured by both the server and the client connections. In some embodiments, this may be the same as the number of completed reads for a given connection. Additionally, a total response time may be estimated as the total time spent in request-to-response pairs.

Figure 5:
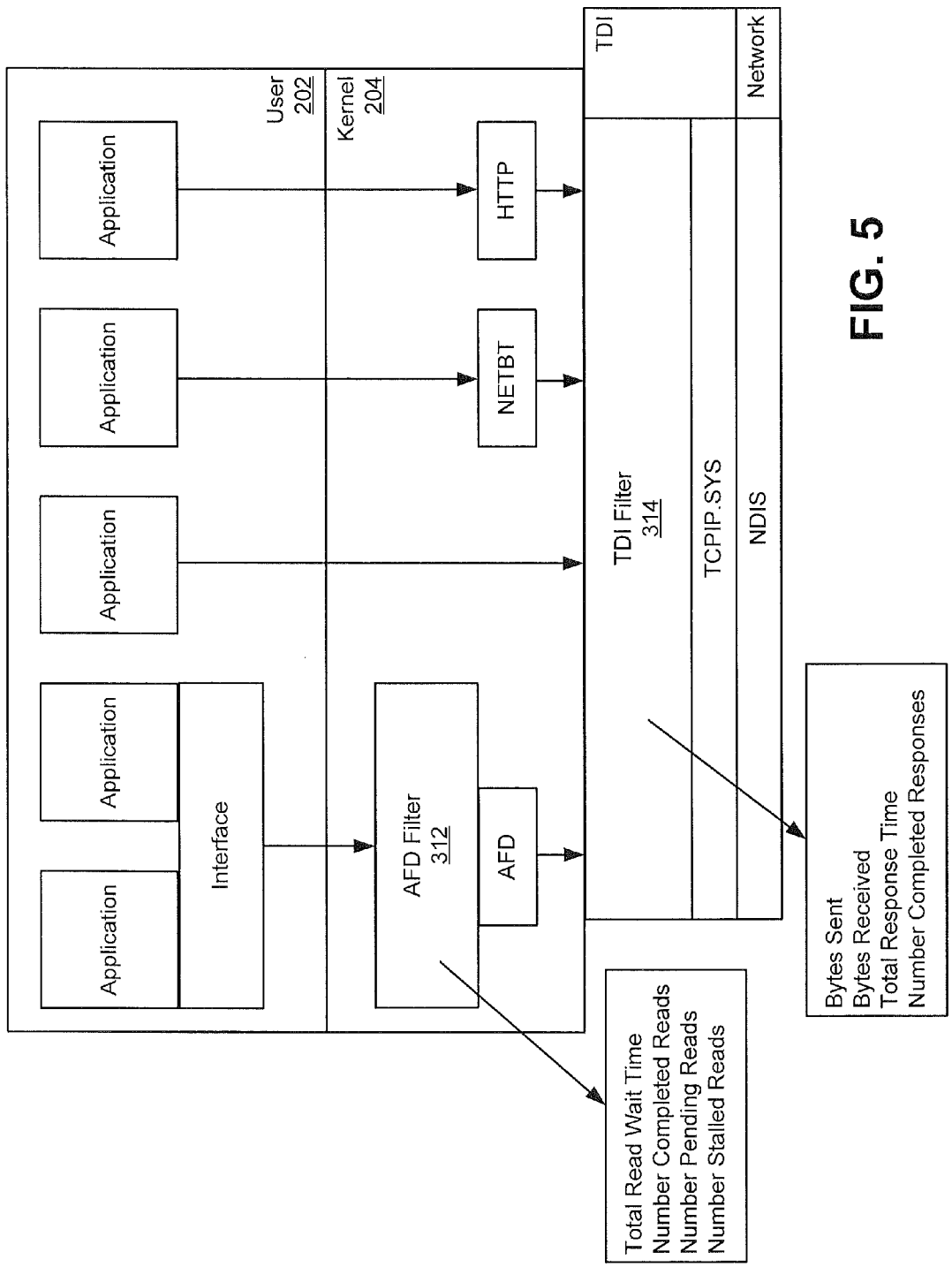
FIG. 5 is a block diagram illustrating a kernel level architecture of a collector application to explain kernel level metrics according to some embodiments of the present invention.

Reference is now made to FIG. 5, which is a block diagram illustrating a kernel level architecture of a collector application 200 to explain kernel level metrics according to some embodiments of the present invention. As discussed above, regarding FIG. 3, the collector may use a TDI filter 314 and an AFD filter 312. The AFD filter 312 may intercept network activity from user space processes that use a library defined in a standard interface between a client application and an underlying protocol stack in the kernel.

The TDI filter 314 may operate on a lower layer of the kernel and can intercept all network activity. As the amount of information available at AFD filter 312 and TDI filter 314 is different, the performance data that may be collected and the metrics that may be generated using each may also be different. For example, the AFD filter 312 may collect AFD performance data and generate AFD metrics that include total read wait time, number of completed reads, number of pending reads and number of stalled reads, among others. The TDI filter may collect TDI performance data and generate TDI metrics including total bytes sent, total bytes received, total response time and the number of responses from the server. Depending on the architecture of a target application, the AFD metrics for client-side connections may or may not be available. In this regard, if the application uses the standard interface, the collector may report non-zero AFD metrics. Otherwise, all AFD metrics may not be reported or may be reported as zero.

Some embodiments provide that kernel level metrics may be generated corresponding to specific events. Events may include read wait metrics that may include client side metrics such as total read wait time, number of completed reads, number of pending reads, number of stalled reads, bytes sent, bytes received, total response time, and/or number of responses, among others. Events may further include server response metrics such as bytes sent, bytes received, total response time and/or number of responses, among others.

In addition to the kernel metrics discussed above, the collector 200 may also generate user level metrics. Such user level metrics may include, but are not limited to aggregate CPU percentage (representing the percentage of CPU time across all cores), aggregate memory percentage (i.e., the percentage of physical memory in use by a process and/or all processes), and/or total network bytes sent/received on all network interfaces, among others. User level metrics may include, but are not limited to, the number of page faults (the number of times any process tries to read from or write to a page that was not in its resident in memory), the number of pages input (i.e., the number of times any process tried to read a page that had to be read from disk), and/or the number of pages output (representing the number of pages that were evicted by the operating system memory manager because it was low on physical memory), among others. User level metrics may include, but are not limited to, a queue length (the number of outstanding read or write requests at the time the metric was requested), the number of bytes read from and/or written to a logical disk in the last time period, the number of completed read/write requests on a logical disk in the last time period, and/or total read/write wait times (corresponding to the number of milliseconds spent waiting for read/write requests on a logical disk in the last time interval), among others.

Further, some additional metrics may be generated using data from external application programming interfaces. Such metrics may include, for example: the amount of memory currently in use by a machine memory control driver; CPU usage expressed as a percentage; memory currently used as a percentage of total memory; and/or total network bytes sent/received, among others.

In some embodiments, events may be generated responsive to certain occurrences in the network. For example events may be generated: when a connection, such as a TCP connection, is established from or to a machine; when a connection was established in the past and the collector application 200 first connects to the health data processing application 100; and/or when a connection originating from the current machine was attempted but failed due to timeout, refusal, or because the network was unreachable. Events may be generated when a connection is terminated; when a local server process is listening on a port; when a local server process began listening on a port in the past and the collector application 200 first connects to the health data processing application 100; and/or when a local server process ceases to listen on a port. Events may be generated if local network interfaces have changed and/or if a known type of event occurs but some fields are unknown. Events may include a description of the static properties of a machine when a collector application 200 first connects to a health data processing application 100; process information data when a process generates its first network-related event; and/or information about physical disks and logical disks when a collector application 200 first connects to a health data processing application 100.

Some embodiments provide that the different link events may include different data types corresponding to the type of information related thereto. For example, data strings may be used for a type description of an event. Other types of data may include integer, bytes and/or Boolean, among others.

In some embodiments, the events generated by collector application 200 for dispatch to heath data processing application 100 may incorporate metrics related to network structure, network health, computational resource health, virtual machine structure, virtual machine health, and/or process identification, among others. Metrics related to network structure may include data identifying the network device on which collector application 200 is executing, or data related to the existence, establishment, or termination of network links, or the existence of bound ports or the binding or unbinding of ports. Metrics pertinent to network health may include data related to pending, completed, and stalled reads, bytes transferred, and response times, from the perspective of the client and/or the server side. Metrics related to computational resource health may include data regarding the performance of the network device on which collector application 200 is executing, such as processing and memory usage. Metrics related to virtual machine structure may include data identifying the physical host machine on which collector application 200 is executing, and/or data identifying the virtual machines executing on the physical host machine. Metrics pertinent to virtual machine health may include regarding the performance of the host machine and/or the virtual machines executing on the host machine, such as processing and memory usage as determined from the perspective of the host machine and/or the virtual machines. Finally, metrics related to process identification may include data identifying individual processes executing on a network device.

Figure 6:
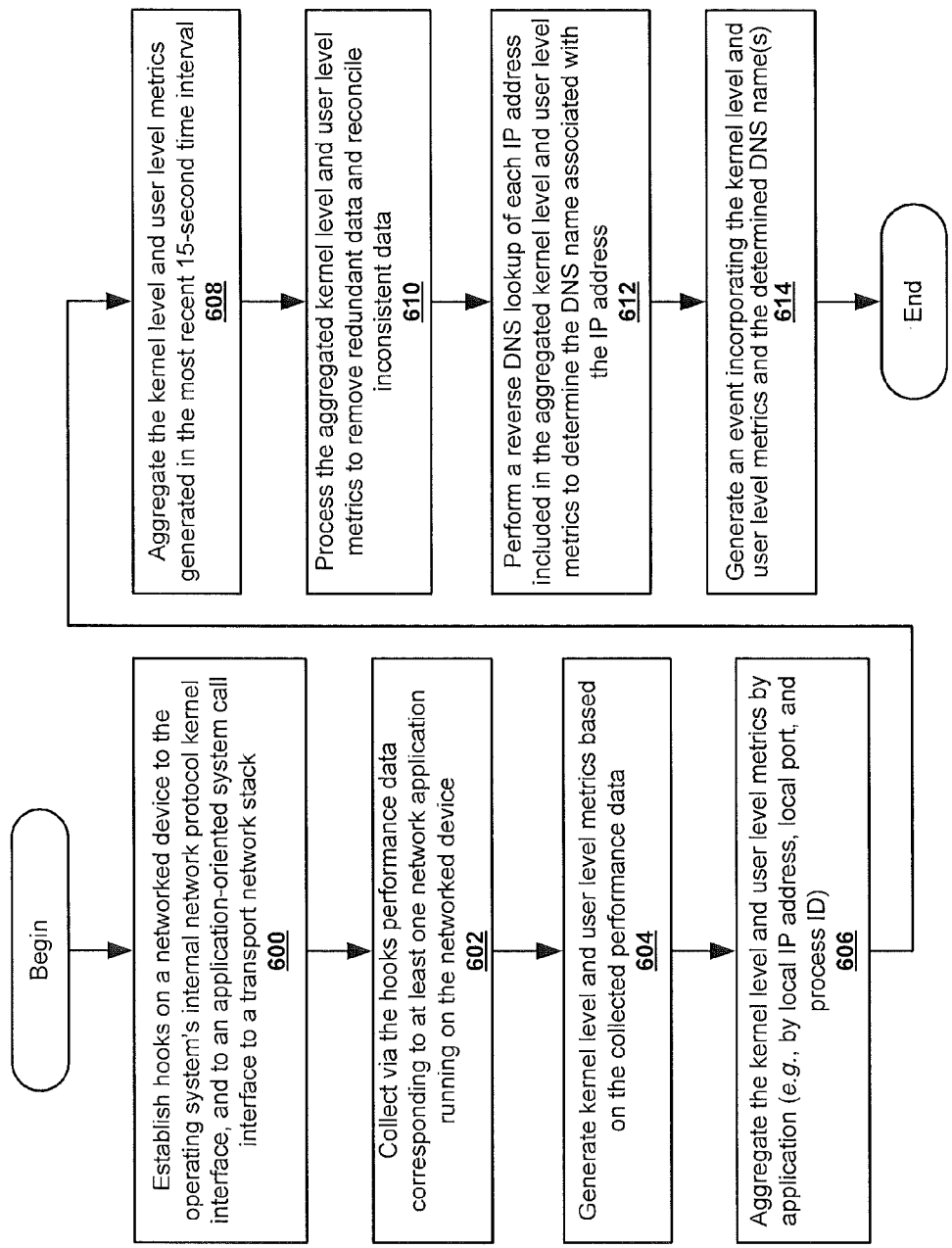
FIG. 6 is a flowchart illustrating exemplary operations carried out by a collector application in monitoring and reporting network application performance according to some embodiments of the present invention.

Reference is made to FIG. 6, which illustrates exemplary operations that may be carried out by collector application 200 in monitoring and reporting network application performance according to some embodiments of the present invention. At block 600, collector application 200 establishes hooks on a networked device to an internal network protocol kernel interface utilized by the operating system of the networked device. In some embodiments, these hooks may include, for instance, a TDI filter. Collector application 200 also establishes hooks to an application oriented system call interface to a transport network stack. The hooks may include, in some embodiments, an AFD filter. Collector application 200 collects, via the established hooks, performance data corresponding to at least one network application running on the networked device (block 602). At block 604, kernel level and user level metrics are generated based on the collected performance data. The generated metrics may provide an indication of the occurrence of an interaction (e.g., establishment of a network link), or may provide measurements of, for instance, a count of some attribute of the collected performance data (e.g., number of completed reads) or a summation of some attribute of the collected performance data (e.g., total read attempts). The kernel level and user level metrics are aggregated by application—e.g., by aggregating metrics associated with the same IP address, local port, and process ID (block 606). At block 608, the kernel level and user level metrics generated within a specified time interval are aggregated. For instance, in some embodiments, metrics generated within the most recent 15-second time interval are aggregated.

At block 610, redundant data is removed from the aggregated metrics, and inconsistent data therein is reconciled. Redundant data may include, for instance, functionally equivalent data received from both the TDI and AFD filters. Collector application 200 performs a reverse DNS lookup to determine the DNS name associated with IP addresses referenced in the generated kernel level and user level metrics (block 612). Finally, at block 614, an event is generated, incorporating the kernel level and user level metrics and the determined DNS name(s). The generated event may be subsequently transmitted to health data processing application 100 for incorporation into a model of network health status.

Installation without Interruption

In some embodiments, the collector application 200 may be installed into a machine of interest without requiring a reboot of the machine. This may be particularly useful in the context of a continuously operable system, process and/or operation as may be frequently found in manufacturing environments, among others. As the collector operations interface with the kernel, and more specifically, the protocol stack, installation without rebooting may entail intercepting requests coming in and out of the kernel using the TDI filter. Some embodiments include determining dynamically critical offsets in potentially undocumented data structures. Such offsets may be used in intercepting network activity for ports and connections that exist prior to an installation of the collector application 200. For example, such previously existing ports and connections may be referred to as the extant state of the machine.

Some embodiments provide that intercepting the stack data may include overwriting the existing stack function tables with pointers and/or memory addresses that redirect the request through the collector filter and then to the intended function. In some embodiments, the existing stack function tables may be overwritten atomically in that the overwriting may occur at the smallest indivisible data level. Each entry in a function table may generally include a function pointer and a corresponding argument. However, only one of these entries (either the function or the argument) can be overwritten at one time. Thus, intercepting function calls may rely on two consecutive overwrites of the stack data corresponding to the function and corresponding argument. In some embodiments, there is no means for protecting from an intervening operation between overwriting one of the function and argument and overwriting the other one of them. In this regard, system stability may be at risk from two attempted consecutive overwrites.

As the consecutive overwrites of intercepting function calls may place the machine at risk of instability, a dynamic overwriting operation may be used. Specifically, a separate data structure is provided that includes a pointer to the original function, its original argument and dynamically generated code to call a filter in the collector application 200. The address of this data structure may be used to atomically overwrite the original function pointer in a single operation. The collector collects the data and then calls the original function corresponding to the overwritten stack data to perform its intended purpose. In this manner, the original behavior of the machine is preserved and the collector application collects the relevant data without rebooting the machine and/or placing the machine at risk of instability.

Some embodiments may include identifying the potentially undocumented data structures representing bound ports and network connections. For example, TDI objects (connections and bound ports) created prior to the installation of the collector application 200 may be determined by first enumerating all objects identified in a system. Each of the enumerated objects may be tagged with an identifier corresponding to its sub-system. A request corresponding to a known TDI object is created and sent for processing. The type codes of the enumerated objects are compared to those of the known TDI object to determine which of the objects are ports and which of the objects are connections. The enumerated objects may then be filtered as either connections or ports.

In some embodiments, this may be accomplished using an in-kernel thread. The thread may monitor network connections having restricted visibility and may detect when a monitored connection no longer exists. Connections may be added dynamically to the monitored list as needed.

Some embodiments provide that events may be generated to indicate that visibility into network events may be incomplete. For example, information may be missing corresponding to an active process, the state of a known connection, and/or missing information regarding network activity. In this manner, depending on conditions, a custom event can be transmitted to indicate what type of information is missing and what process may be responsible for that information.

Health Data Processing Application

In some embodiments, the health data processing application 100 may be operable to receive, from at least one collector application 200, network activity data corresponding to network activity of the applications on the network device on which the collector application 200 is installed. The health data processing application 100 may combine the network activity data received from the collector application 200 to remove redundant portions thereof. In some embodiments, the health data processing application 100 may archive the received activity data in a persistent data store along with a timestamp indicating when the activity data was collected and/or received. The health data processing application 100 may generate a model that includes identified network application components and their relatedness and/or links therebetween. The generated model may be displayed via one or more display devices such as, e.g., display devices 124a-124n discussed in greater detail above.

In some embodiments, the health data processing application 100 may be operable to combine network activity data reported from multiple collector applications 200 to eliminate redundancy and to address inconsistencies among data reported by different collector applications 200. For example, network data from multiple collector applications 200 may be stitched together to create a consistent view of the health of the network applications.

Some embodiments provide that the model may be a graphical display of the network including application components (machines, clients, processes, etc.) and the relationships therebetween. In some embodiments, the model may be generated as to reflect the real-time or near-real-time activity of the network. It is to be understood that, in this context, "near-real-time" may refer to activity occurring in the most recent of a specified time interval for which activity data was received. For instance, health data processing application 100 may receive from collector applications 200 aggregated activity data corresponding to the most recent 15-second interval of network operation, and, accordingly, the model of near-real-time activity may reflect the activity of the network as it existed during that most recent 15-second interval.

Some embodiments provide that the model may be generated to reflect an historical view of network activity data corresponding to a specified time interval. The historical view may be generated based on archived activity data retrieved from a persistent data store and having a timestamp indicating that the activity data was collected or received during the specified time interval. In other embodiments, the model may be dynamically updated to reflect new and/or lost network collectors and/or network components. Further, graphs may be provided at each and/or selected network resource indicators to show activity data over part of and/or all of the time interval.

In some embodiments, a model may include sparklines to provide quick access to trends of important metrics, process and application views to provide different levels of system detail, and/or model overlays to provide additional application analysis. For example, visual feedback regarding the contribution of a network link relative to a given criterion may be provided. In this manner, hop by hop transaction data about the health of applications can be provided. Additionally, visual ranking of connections based on that criteria may be provided. Bottleneck analysis based on estimated response times may be provided to identify slow machines, applications, and/or processes, among others.

Some embodiments provide that health data processing application 100 may be operable to infer the existence of network devices and/or network applications for which no activity data was received or on which no collector application 200 is running, based on the identification of other network devices and/or other network applications for which activity data was received. For instance, activity data received by health data processing application 100 may indicate that a network link has been established between a local network device running collector application 200 and a remote network device that is not running collector application 200. Because the activity data may include identifying information for both the local and remote network devices, health data processing application 100 may infer that the remote network device exists, and incorporate the remote network device into the generated model of network activity.

In other embodiments, health data processing application 100 may be operable to identify a network application based on predefined telecommunications standards, such as, e.g., the port numbers list maintained by the Internet Assigned Numbers Authority (IANA). Health data processing application 100 may, for example, receive activity data indicating that a process on a network device is bound to port 21. By cross-referencing the indicated port number with the IANA port numbers list, health data processing application 100 may identify the process as an File Transfer Protocol (FTP) server, and may include the identification in the generated model.

Figure 7:
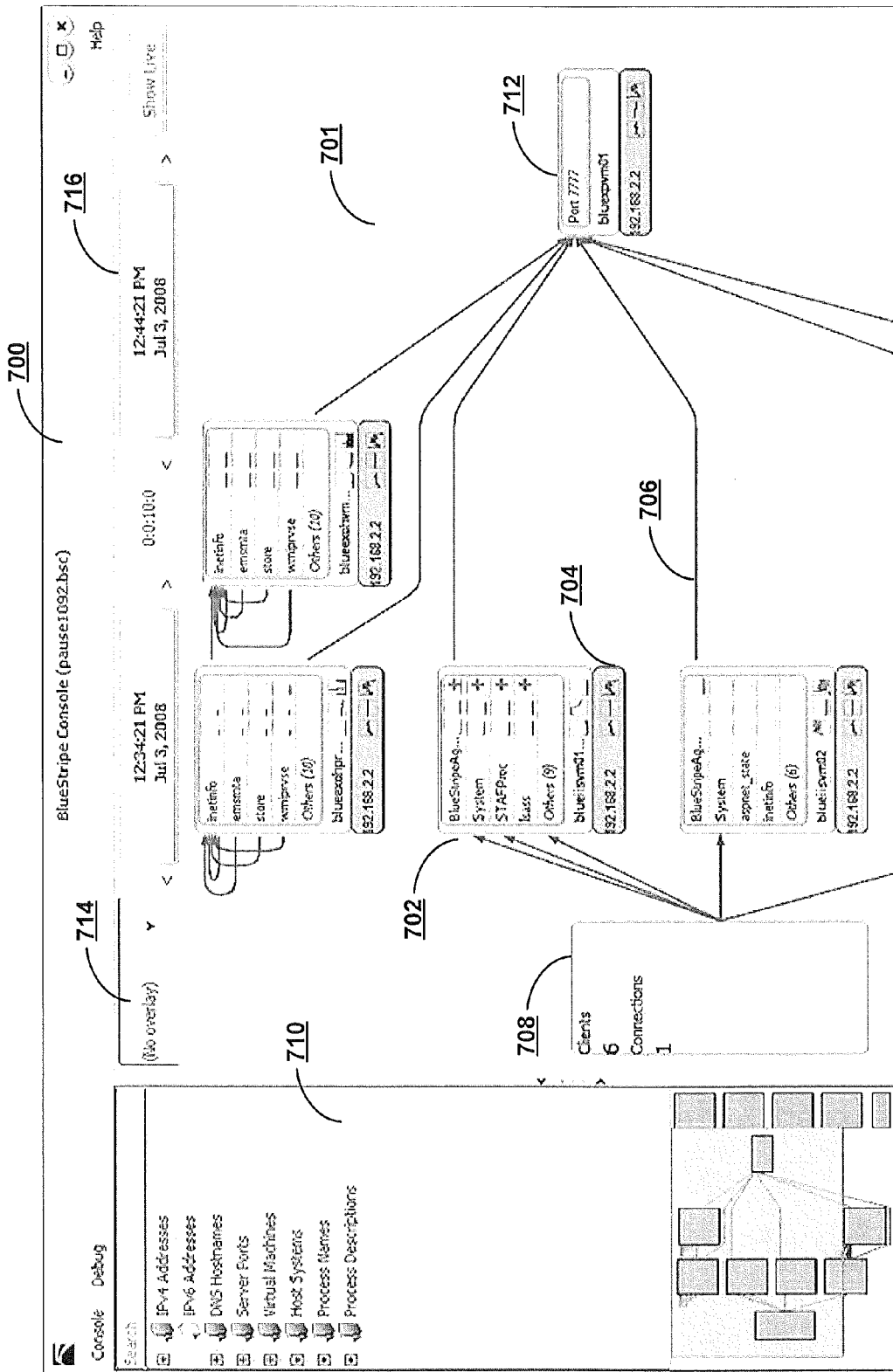
FIG. 7 is a screen shot of a graphical user interface (GUI) including a model generated by a health data processing application according to some embodiments of the present invention.

Reference is made to FIG. 7, which is a screen shot of a graphical user interface (GUI) including a model generated by a health data processing application according to some embodiments of the present invention. The GUI 700 includes a model portion 701 that illustrates representations of various network applications and/or application components 702. Such representations may include identifier fields 704 that are operable to identify application and/or application component addresses, ports, machines and/or networks. Connections 706 between network applications and/or application components may be operable to convey additional information via color, size and/or other graphical and/or text-based information. A summary field 708 may be provided to illustrate summary information corresponding to one or more applications and/or application components, among others. A port identification portion 712 may be operable to show the connections corresponding to and/or through a particular port. The GUI 700 may include a system and/or network navigation field 710, overlay selection field 714, and one or more time interval and/or snapshot field(s) 716.

Figure 8:
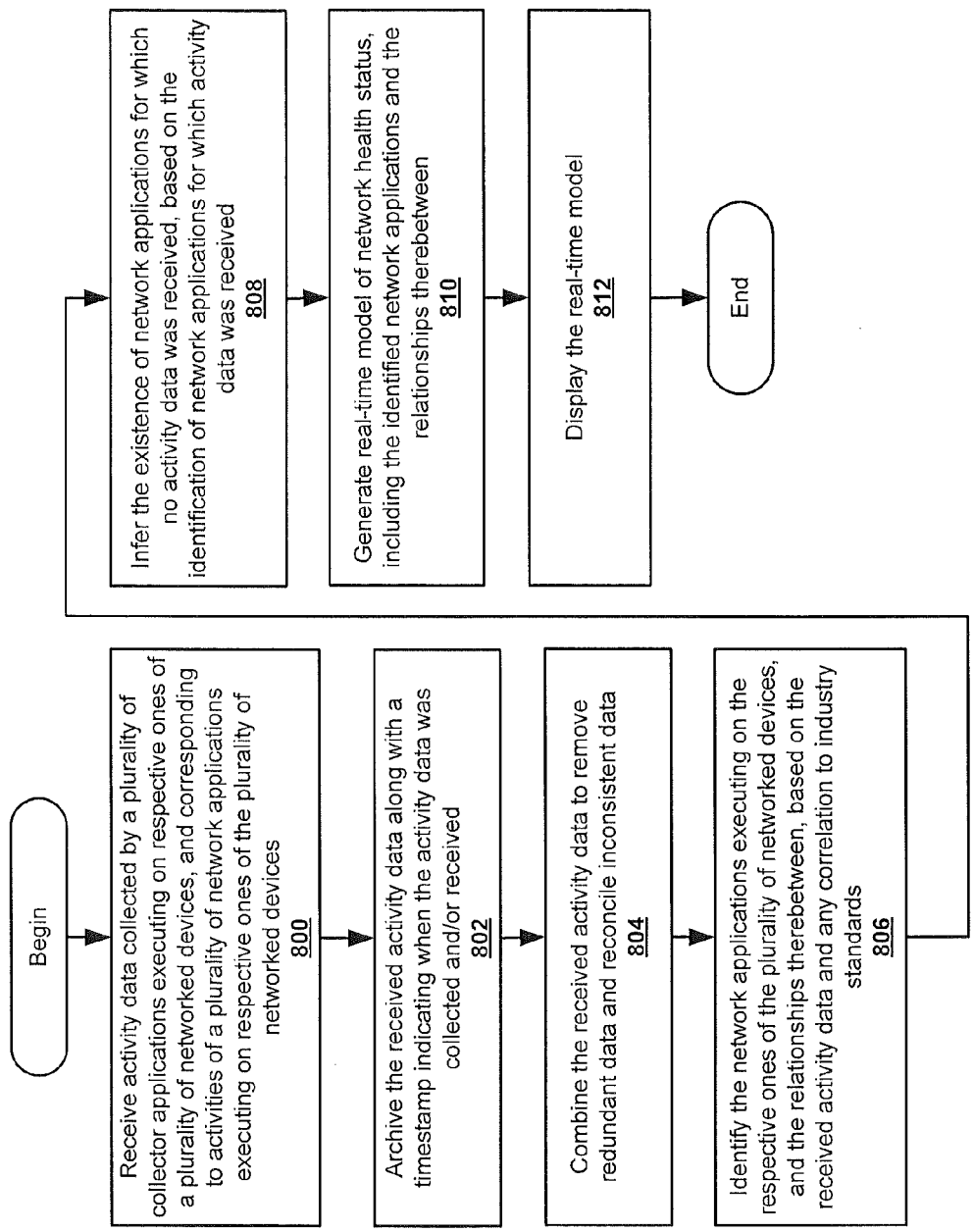
FIG. 8 is a flowchart illustrating exemplary operations carried out by a health data processing application in gener-ating and displaying a real-time model of network application health according to some embodiments of the present invention.

FIG. 8 is a flowchart illustrating exemplary operations that may be carried out by health data processing application 100 in generating and displaying a real-time model of network application health according to some embodiments of the present invention. At block 800, health data processing application 100 may receive activity data from a plurality of collector applications 200 executing on respective ones of a plurality of network devices. The received activity data corresponds to activities of a plurality of network applications executing on respective ones of the plurality of networked devices. At block 802, the received activity data is archived along with a timestamp indicating when the activity data was collected and/or received. As discussed in greater detail with respect to FIG. 9, this archived data may allow health data processing application 100 to generate and display an historical model of network application health during a specified time interval. At block 804, the received activity data is combined to remove redundant data and to reconcile inconsistent data. At block 806, health data processing application 100 identifies the network applications executing on the respective ones of the plurality of networked devices, and ascertains the relationships therebetween. The identification of the network applications and the relationships therebetween may be based on the received activity data, and may further be determined based on a correlation between the received activity data and predefined industry standards, as discussed above. At block 808, health data processing application 100 may infer the existence of network applications for which no activity data was received, based on the identification of network applications for which activity data was received. At block 810, a real-time model of network health status, including the identified network applications and the relationships therebetween, is generated, and the model is displayed at block 812.

Figure 9:
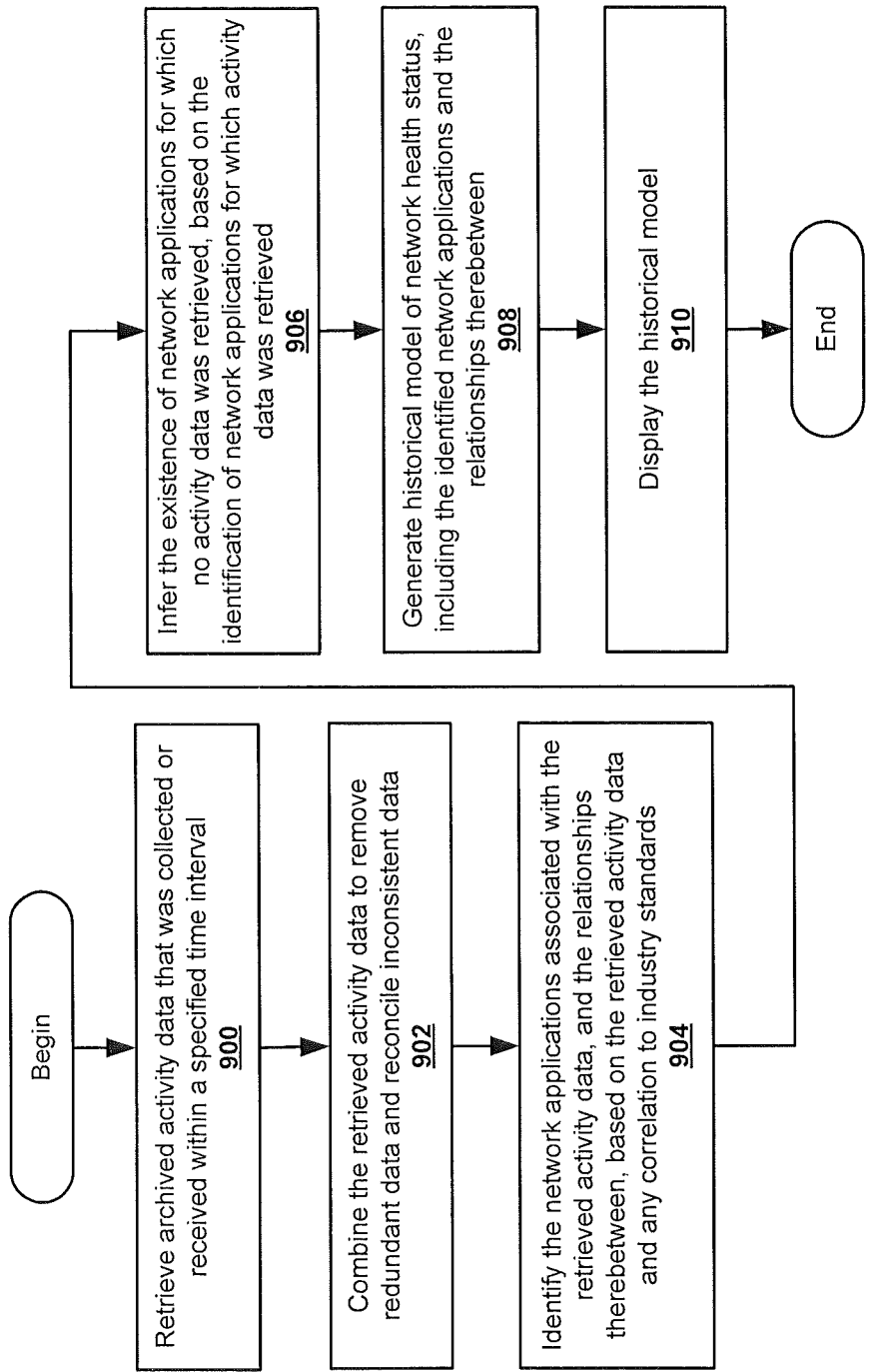
FIG. 9 is a flowchart illustrating exemplary operations carried out by a health data processing application in generating and displaying an historical model of network application health according to some embodiments of the present invention.

FIG. 9 is a flowchart illustrating exemplary operations carried out by a health data processing application 100 in generating and displaying an historical model of network application health according to some embodiments of the present invention. At block 900, the activity data previously archived at block 802 and corresponding to a specified time interval is retrieved. The retrieved activity data is combined to remove redundant data and reconcile inconsistent data at block 902. At block 904, health data processing application 100 identifies the network applications associated with the retrieved activity data, and ascertains the relationships therebetween. The identification of the network applications and the relationships therebetween may be based on the retrieved activity data, and may further be determined based on correlation between the retrieved activity data and industry standards. At block 906, health data processing application 100 may infer the existence of network applications for which no activity data was retrieved, based on the identification of network applications for which activity data was retrieved. At block 908, an historical model of network health status in the specified time interval, including the identified network applications and the relationships therebetween, is generated, and the historical model is displayed at block 910.

Custom Protocol

Some embodiments provide that transferring the activity data between the collector applications 200 and the health data processing application 100 may be performed using a compact, self-describing, linear buffer communications protocol. In some embodiments, the custom protocol uses a common representation for monitoring information, commands and configuration data. As the methods and systems described herein are intended to monitor network performance, the protocol may be operable to minimize the volume of information exchanged between the collector applications 200 and the health data processing application 100.

In some embodiments, the collector applications 200 are operable to generate events in a streaming data format. Events may be generated corresponding to the predefined monitoring time period. Information provided corresponding to an event may include an event type, network resource identification data including PID, remote identifiers, quantities and/or types of data sent/received, and/or response time information, among others. The protocol may include a banner portion that may be established through a handshaking process that may occur when a collector application 200 initially communicates with the health data processing application 100. The banner portion may define the data types and formats to be transferred. In this manner, the protocol may be flexible by virtue of the self-descriptive banner portion and may avoid sending unused, unwanted or blank data fields.

Monitoring System Function Calls Using Safely Removable System Function Table Chaining As noted above with respect to FIG. 3, a collector application 200 may include a kernel space module 310, which may generally operate to intercept network activities and/or to intercept application operational data. In some embodiments, this may be accomplished through the use of functionality built into and provided by the operating system itself. For instance, some embodiments may make use of the Linux "kprobes" utility, which allows performance information to be non-disruptively collected from any kernel routine. Other embodiments may utilize, for example, the the Solaris operating system's "dtrace" utility, which dynamically monitors the operating system kernel and user processes to record data at locations of interest. Utilities such as "kprobes" and "dtrace" may allow collector application 200 to monitor calls to system functions by network applications, and to collect and report performance data for the network applications. There are disadvantages inherent in this approach, however. In particular, porting collector application 200 to a different operating system may be difficult or impossible if the target operating system does not provide a utility offering functionality comparable to that of the "kprobes" or "dtrace" utilities without unacceptable overhead. Moreover, even if the target operating system does provide such functionality, the costs of maintaining operating system specific versions of collector application 200 may be prohibitive, and licensing conditions may impose restrictions on the use of such utilities.

Figure 10:
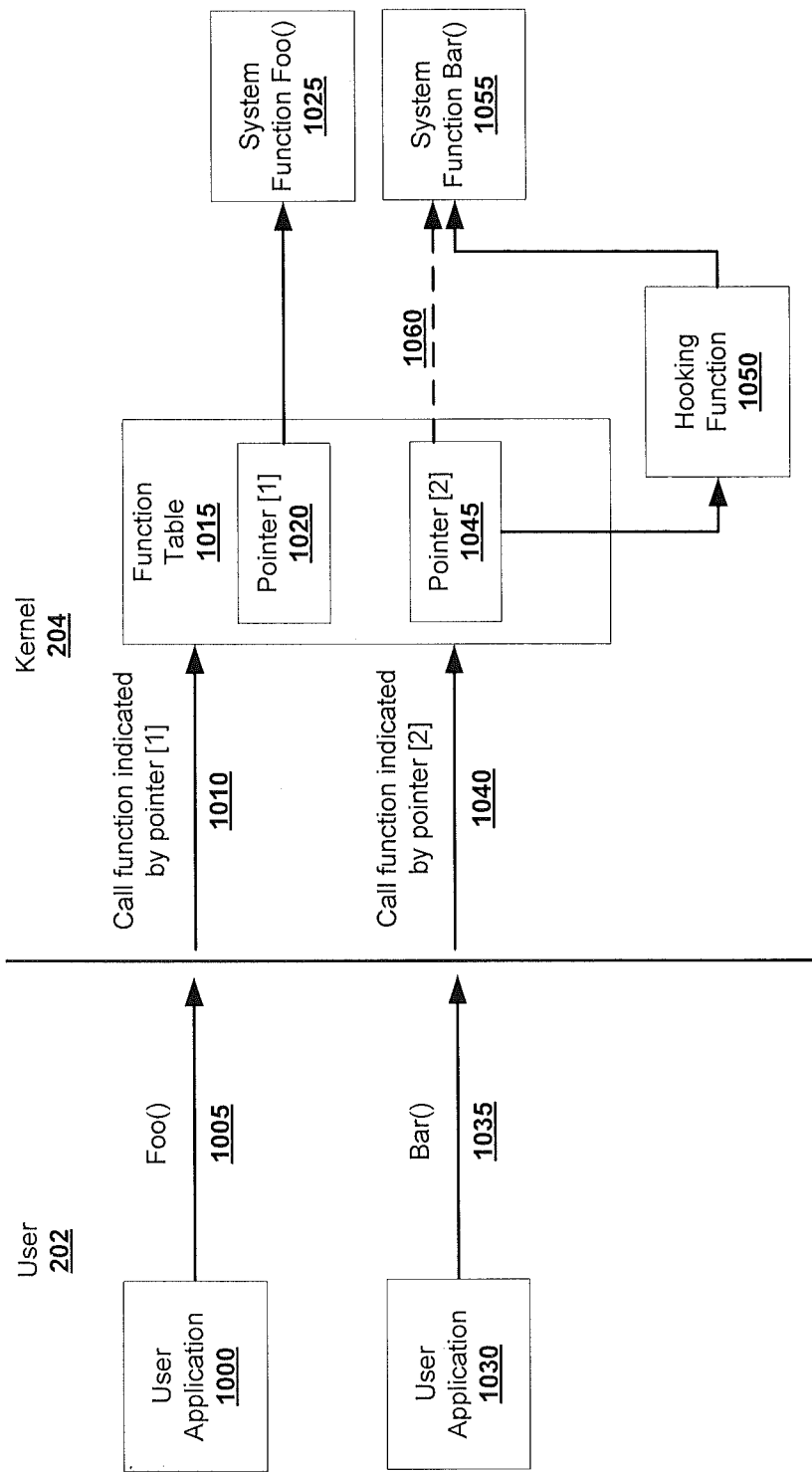
FIG. 10 is a block diagram illustrating methods for hooking system calls to explain safely removable system function table chaining according to some embodiments of the present invention.

One alternate, relatively operating-system-independent method for monitoring calls to system functions is a technique known as "hooking" the system functions. Typically, an operating system includes one or more tables containing function pointers, or memory addresses, of system functions, such as those related to, e.g., socket dispatching. As seen in FIG. 10, for instance, the operating system executing in kernel space 204 may maintain a function table 1015 containing function pointer [1] 1020 to system function Foo( ) 1025. When user application 1000 executing in user space 202 issues a function call 1005 to function Foo( ) function call 1005 is mapped by the operating system into an instruction 1010 to call the function located at the memory address indicated by function pointer [1] 1020 in the function table 1015. Because the memory address indicated by function pointer [1] 1020 points to system function Foo( ) 1025, system function Foo( ) 1025 is executed as a result of the call to function Foo( ) by user application 1000. It is to be understood that, in the present example, pointer 1020 is a function pointer; however, pointer 1020 may also be any of various other types of access descriptors, such as function descriptors provided by the AIX operating system and comprising function pointers and table of content anchors.

When a system function is hooked, the contents of the function table 1015 are modified to redirect calls to the system function. For example, in FIG. 10, pointer [2] 1045 in function table 1015, which previously contained a function pointer to system function Bar( ) 1055 as indicated by dotted line 1060, has been altered to instead point to hooking function 1050. When user application 1030 issues a function call 1035 to function Bar( ) function call 1035 is mapped by the operating system into an instruction 1040 to call the function located at the memory address indicated by function pointer [2] 1045 in the function table 1015. Because pointer 1045 now points to hooking function 1050, hooking function 1050 is executed as a result of the call to function Bar( ) by user application 1030. Once hooking function 1050 has completed execution, it may then call system function Bar( ) 1055 originally pointed to by function pointer [2] 1045 to provide the functionality of system function Bar( ) 1055.

By hooking system function calls, an application such as collector 200 may intercept and monitor all calls to hooked system functions, and may provide functionality to supplement or even replace the functionality provided by system functions. However, this technique as illustrated in FIG. 10 is not without risks. The functionality of hooking function 1050, for instance, depends on pointer 1045 storing the memory address of hooking function 1050. If a subsequently installed application changes the memory addresses stored in pointer 1045, then the functionality provided by hooking function 1050 may be unavailable. Moreover, while hooking functions may be "chained" such that multiple hooking functions are executed in sequence in response to a single system function call by a user application, the operating system may be destabilized by the installation or removal of one of the hooking functions in the chain, particularly if the hooking function is unaware of or does not account for the presence of other hooking functions installed previously or subsequently. This may result in, for instance, system crashes caused by outstanding calls to hooked functions that attempt to return through code that has been removed.

Figure 11:
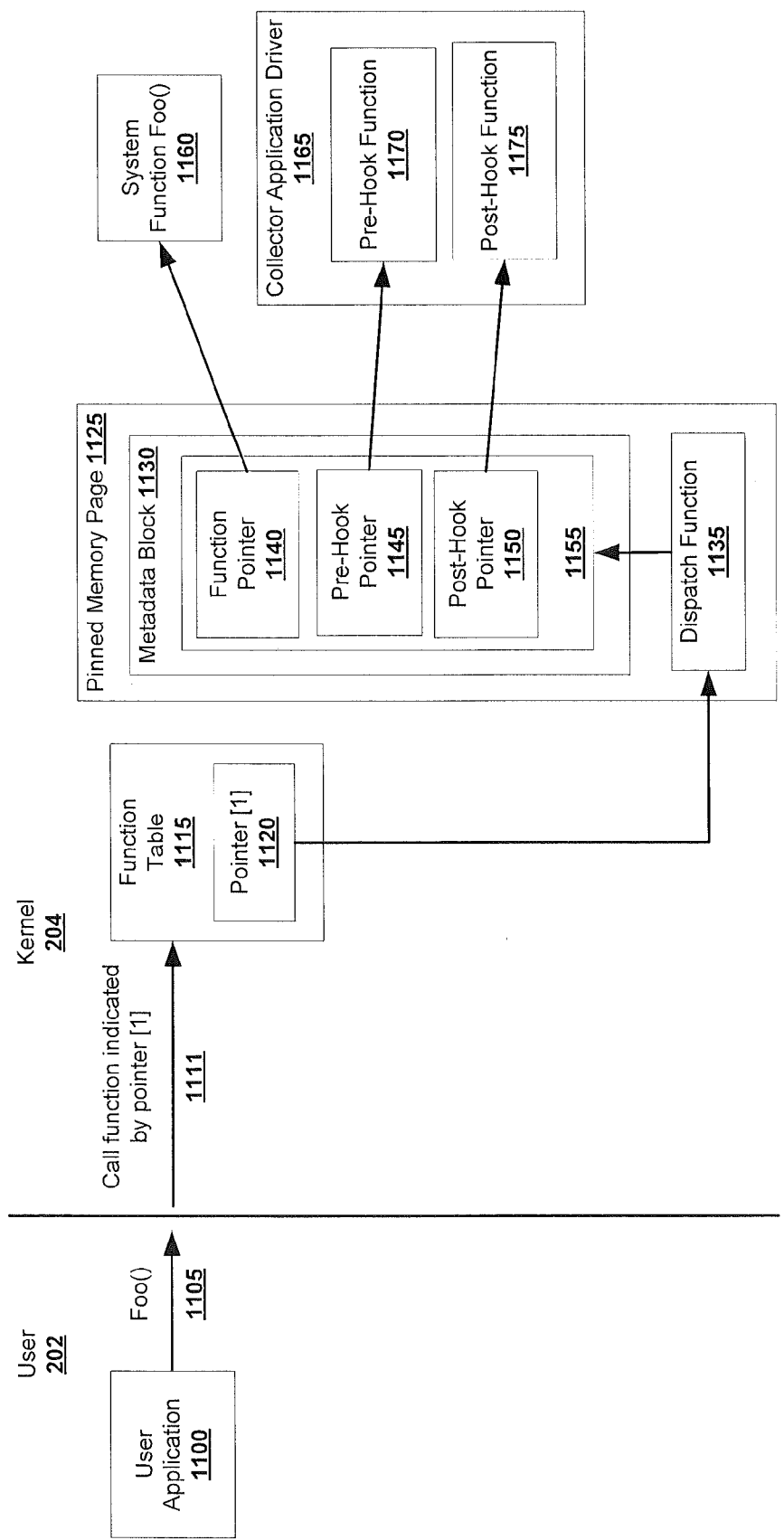
FIG. 11 is a block diagram illustrating safely removable system function table chaining according to some embodiments of the present invention.

In some embodiments, therefore, collector application 200 may provide a method of monitoring system calls using safely removable function table chaining. FIG. 11 illustrates exemplary data structures and functions that may provide safely removable function table chaining according to some embodiments. Dispatch function 1135 and metadata block 1130 may be loaded into a dynamically allocated page of pinned kernel memory 1125. It is to be understood that "pinned" kernel memory is memory that will not be swapped to disk or other physical media as part of a virtual memory management system, and that is globally accessible from within kernel space 204. Accordingly, metadata block 1130 and dispatch function 1135 may remain persistent in memory, and may always be accessible in kernel space 204.

Metadata block 1130 contains metadata 1155, which may include a function pointer 1140 to system function Foo( ) 1160. To implement safely removable function table chaining, function pointer [1] 1120 in function table 1115, rather than being modified to point to a hooking function, instead may be altered to point to dispatch function 1135. Dispatch function 1135, in turn, may be operable to access metadata 1155 in metadata block 1130 to determine the memory address stored in function pointer 1140, and may use that memory address to call system function Foo( ) 1160.

Metadata 1155 in metadata block 1130 may include pre-hook function pointer 1145 and post-hook function pointer 1150. Pre-hook function pointer 1145 may store the memory address of pre-hook function 1170 provided by collection application driver 1165. Likewise, post-hook function pointer 1150 may store the memory address of post-hook function 1175 in collector application driver 1155. Dispatch function 1135 may be operable to access metadata 1155 in metadata block 1130 to determine the memory address stored in pre-hook function pointer 1145 and post-hook function pointer 1150, and may use those memory addresses to call pre-hook function 1170 and post-hook function 1175, respectively, provided by collection application driver 1065. It is to be understood that, in the present example, pointers 1120, 1140, 1145, and 1150 are function pointers; however, pointers 1120, 1140, 1145, and 1150 may also be any of various other types of access descriptors, such as function descriptors provided by the AIX operating system and comprising function pointers and table of content anchors. As discussed in greater detail with respect to FIG. 13, when dispatch function 1135 is executed, it may call pre-hook function 1170 prior to calling system function Foo( ) 1160, and/or may call post-hook function 1175 after calling system function Foo( ) 1160. In this way, collector application 200, through the pre-hook function 1170 and post-hook function 1175 in collector application driver 1165, may inspect the system environment and collect performance data both before and after a call to system function Foo( ) 1160.

In some embodiments, dispatch function 1135 may take as arguments the same arguments passed by user application 1100 into its function call 1105, and may forward those arguments to pre-hook function 1170 and/or post-hook function 1175 in collector application driver 1165. This may allow collector application 200, through the pre-hook function 1170 and post-hook function 1175 in collector application driver 1165, to inspect the arguments that are passed into system function Foo( ) 1160 both before and after dispatch function 1135 calls system function Foo( ) 1160. Some embodiments may provide that dispatch function 1135 may pass output received from pre-hook function 1170 in collector application driver 1165 as an argument to post-hook function 1175 in collector application driver 1165. In some embodiments, dispatch function 1135's call to post-hook function 1175 may be contingent on output received from pre-hook function 1170—i.e., logic in pre-hook function 1170 may determine whether or not post-hook function 1175 is called by dispatch function 1135.

Some embodiments may provide that dispatch function 1135 may access metadata 1155 in metadata block 1130 by automatically determining the location of metadata block 1130 in memory based on the location of dispatch function 1135 in memory. For instance, dispatch function 1135 may identify the memory page in which it is executing, and may determine that the header of the memory page contains a reference to metadata block 1130, thus providing pointer-based access to metadata block 1130 and the pointers therein. Some embodiments may provide that dispatch function 1135 addresses memory addresses using only relative addressing, and, thus, may be relocatable in memory.

In some embodiments, metadata 1155 in metadata block 1130 may include reference counters (not shown) for tracking outstanding calls to pre-hook function 1170 and/or post-hook function 1175 in collector application driver 1165. These reference counters may be used to ensure the safe removal of collector application driver 1165 by allowing the deallocation of data structures used by pre-hook function 1170 and/or post-hook function 1175 to be postponed until any outstanding calls have completed execution. Some embodiments may provide that updates to the reference counters are made using architecture-specific atomic operation primitives, which may ensure that only one entity at a time can access and modify the reference counters.

Figure 12:
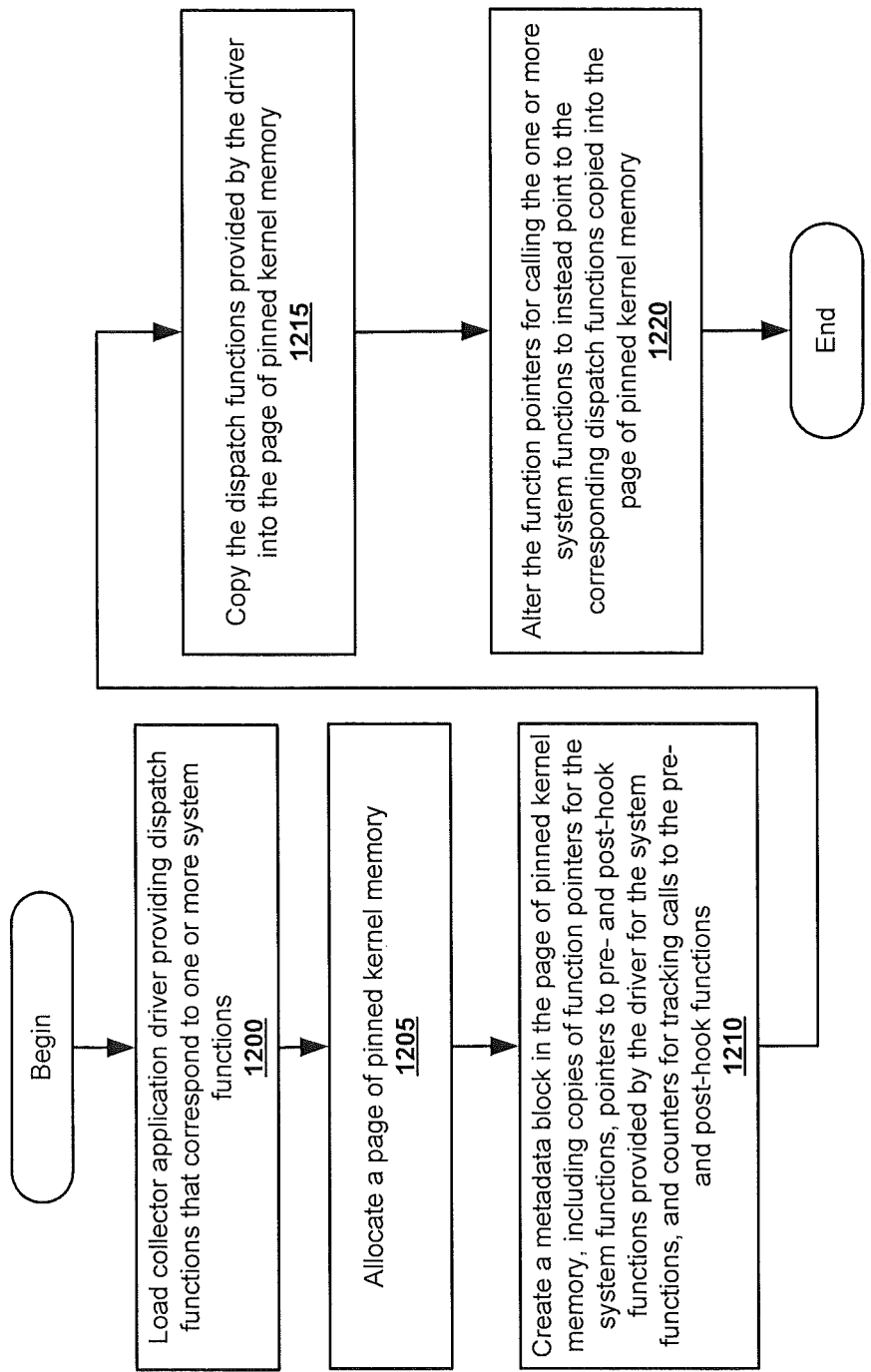
FIG. 12 is a flowchart illustrating exemplary operations carried out a collector application in creating and configuring the data structures used in safely removable system function table chaining according to some embodiments of the present invention.

Reference is now made to FIG. 12, which illustrates exemplary operations carried out by collector application 200 in creating and configuring the data structures used in safely removable system function table chaining according to some embodiments of the present invention. At block 1200, collector application 200 loads into kernel space a collector application driver. The collector application driver provides one or more dispatch functions that correspond to one or more system functions to be intercepted. Collector application 200 allocates a page of pinned kernel memory (block 1205). At block 1210, collector application 200 creates a metadata block in the page of pinned kernel memory. The metadata block stores metadata for each of the system functions to be hooked, including a function pointer for the system function, as well as function pointers for a pre-hook function and a post-hook function for the system function, and reference counters for tracking calls to the pre-hook function and the post-hook function. Collector application 200 copies dispatch functions provided by the collector application driver into the page of pinned kernel memory (block 1215). Collector application 200 then alters the function pointers for calling the one or more system functions (e.g., the function pointers in a system function table) to instead point to the corresponding dispatch functions copied into the page of pinned kernel memory (block 1220). It is to be understood that alterations of the function pointers may be made utilizing architecture specific atomic operation privileges, to avoid corruption to the pointers resulting from simultaneous attempts to modify the pointers. Subsequently, all calls to the one or more system functions by a user application are routed to the corresponding dispatch function for processing.

Figure 13:
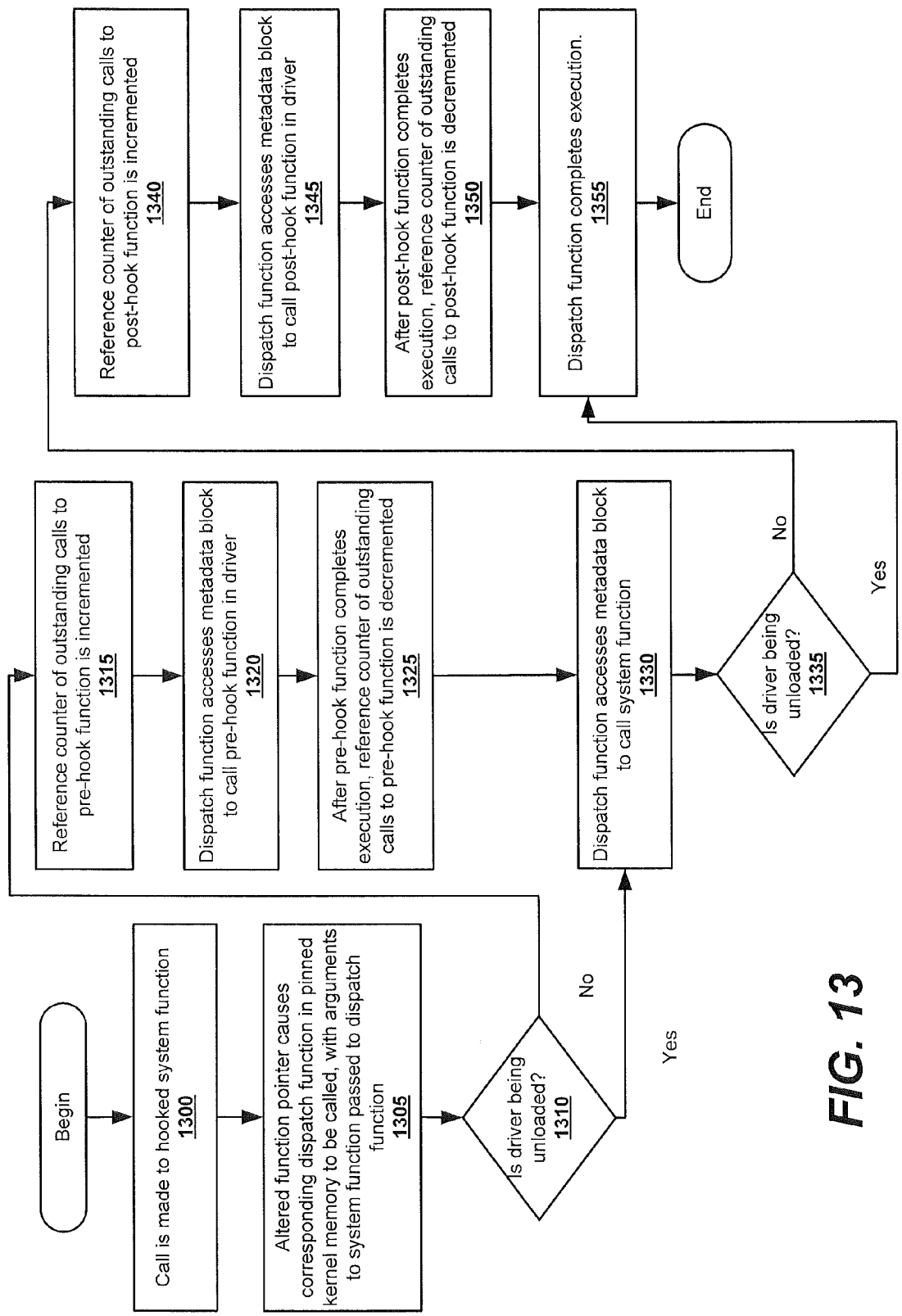
FIG. 13 is a flowchart illustrating exemplary operations carried out a dispatch function in intercepting and monitoring a system function call according to some embodiments of the present invention.

An example of processing that may be carried out by a dispatch function according to some embodiments of the present invention is illustrated in FIG. 13. At block 1300, a call is made to a hooked system function—i.e., a system function for which the operating system has been configured to intercept calls. The function pointer that was previously altered as described above now causes the dispatch function corresponding to the hooked system function to be called, with the arguments to the system function passed to the dispatch function. The dispatch function first performs a safety check to determine whether the collector application driver is in the process of being unloaded (block 1310). If so, then calling the pre-hook function in the collector application driver may cause system destabilization; accordingly, processing continues at block 1330. If the collector application driver is not being unloaded, the dispatch function increments the reference counter of outstanding calls to the pre-hook function (block 1315). The dispatch function accesses the metadata block to determine the memory address indicated by the function pointer for the pre-hook function provided by the collector application driver, and calls the pre-hook function (block 1320). After the pre-hook function has completed execution, the dispatch function then decrements the reference counter of outstanding calls to the pre-hook function (block 1325).

At block 1330, the dispatch function accesses the metadata block to determine the memory address indicated by the function pointer for the system function, and calls the system function with the arguments passed in to the dispatch function. After execution of the system function is complete, the dispatch function again determines whether the collector driver application is in the process of being unloaded (block 1335). If so, processing continues at block 1355. If not, the dispatch function increments the counter of outstanding calls to the post-hook function (block 1340). The dispatch function accesses the metadata block to determine the memory address indicated by the function pointer for the post-hook function provided by the collector application driver, and calls the post-hook function (block 1345). After the post-hook function has completed execution, the dispatch function then decrements the counter of outstanding calls to the post-hook function (block 1350). It is to be understood that the incrementing and decrementing of the counters of outstanding calls to the pre-hook function and the post-hook function may be accomplished using architecture specific atomic operation primitives. At block 1355, the dispatch function completes execution.

Figure 14:
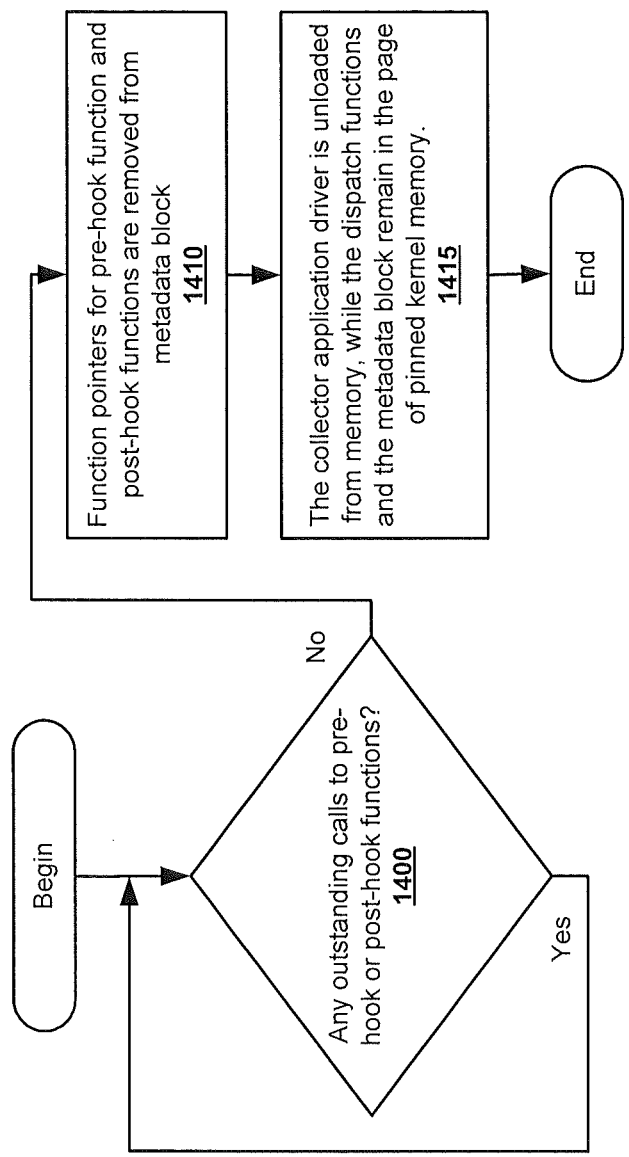
FIG. 14 is a flowchart illustrating exemplary operations carried out a collector application in safely removing a collector application driver according to some embodiments of the present invention.

Reference is now made to FIG. 14, which illustrates exemplary operations carried out by collector application 200 in unloading the collector application driver—e.g., to reinstall or upgrade the existing collector application driver—according to some embodiments of the present invention. At block 1400, collector application 200 determines whether there are any outstanding calls to any pre-hook functions and/or post-hook functions for hooked system calls. In some embodiments, this may be accomplished by checking the reference counts of outstanding calls to pre-hook functions and/or post-hook functions maintained in the metadata block. If there exist outstanding calls—i.e., if any pre-hook functions or post-hook functions have been called but have not completed execution—then collector application 200 continues to repeat the operations at block 1400. If no outstanding calls exist, then collector application 200 removes the function pointers to the pre-hook functions and post-hook functions from the metadata block (block 1410). Collector application 200 may then unload the collector application driver from memory, while allowing the dispatch functions and metadata block to remain in the page of pinned kernel memory (block 1415). Because the dispatch functions and metadata block persist in the page of pinned kernel memory, subsequent calls to the hooked system calls by user applications will still be redirected to the dispatch functions resident in memory, which will simply call the corresponding system functions. In this way, the collector application driver may be safely removed without any risk of access faults, and without affecting any other previously or later installed hooking functions. The dispatch functions persisting in memory may later be reclaimed using the metadata block, resulting in reduced cost and memory footprint when collector application 200 is subsequently reloaded.

Collecting Storage Resource Performance Data Using File System Hooks

Some embodiments of collector application 200 may gather data and generate metrics related to the performance of storage resources—i.e., the file systems and associated physical data storage devices—utilized by the network applications and computing devices on a network. In some embodiments, the performance data associated with storage resources may be collected via interfaces provided directly by the operating system for accessing storage metrics. However, such an approach may hinder the portability of collector application 200 to different operating systems, as the various operating systems may not provide comparable functionality for accessing storage resource performance data without unacceptable overhead. Moreover, the complexity of managing and monitoring storage resources has only increased as users have migrated from local disk-based data storage devices to advanced technologies such as storage area networks (SANs) and network-based file systems. Indeed, in the case of some third-party storage solutions, the operating system itself may be largely unaware of the underlying structure and performance of the storage resources utilized by network applications.

In some embodiments, therefore, collector application 200 may take advantage of the modular architecture of modern file systems, and of the fact that such file systems, while responsible for management of their own internal resources and associated physical data storage devices, are implemented against an application programming interface (API) that may be specifically dictated by the operating system. This API may be specified by, for example, a virtual file system (VFS) layer between the operating system and the implementation of the file system. Collector application 200 may use the technique of "hooking," as described generally above, to chain itself between the VFS layer and the underlying file system implementation, thereby allowing collector application 200 to intercept, e.g., invocations of the file system's read or write functions. In this way, some embodiments of collector application 200 may decouple the collection of performance data and the generation of storage metrics from the implementation of the file system and the associated physical data storage devices. The performance data thus collected may allow some embodiments to generate a richer set of storage metrics—e.g., in addition to typical metrics such as throughput and queue length, metrics such as average time per input/output operation may be calculated per mount point. This technique may allow some embodiments to provide timing information for an application context using a single set of hooks for file systems such as, but not limited to, Journaled File System (JFS), as well as for file systems having resources solely managed by a remote entity (e.g., Network File System (NFS)) or block level storage (e.g., iSCSI or Fibre Channel).

Figure 15:
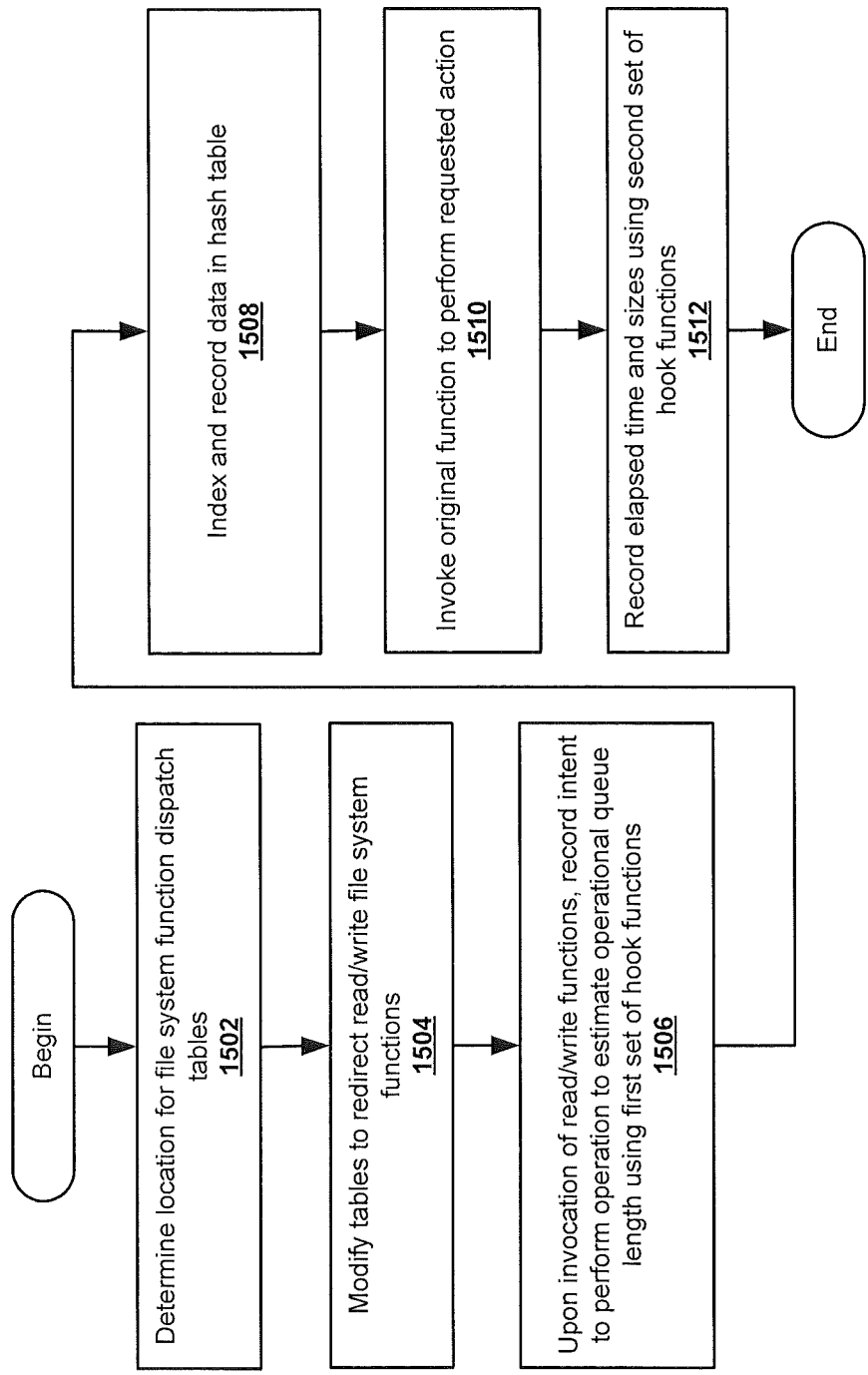
FIG. 15 is a flowchart illustrating exemplary operations carried out a collector application in collecting storage resource performance data using file system hooks according to some embodiments of the present invention.

Reference is now made to FIG. 15, which illustrates exemplary operations carried out by collector application 200 in collecting storage resource performance data according to some embodiments of the present invention. At block 1502, collector application 200 determines the location in memory of the function dispatch tables in which pointers to the file system's read and/or write functions are dynamically loaded and stored. In some embodiments, executing on the Solaris operating system, for instance, this may be accomplished by using the kernel object symbol to extract the location for dynamically loaded vnode function dispatch tables. Collector application 200 then "hooks" the file system's read and/or write functions by modifying the function dispatch tables to redirect invocations of the read and/or write functions to collector application 200's hook functions (block 1504). Upon invocation of the file system's read and/or write functions, the hook functions to which the read and/or write functions are redirected may first record the intention to perform the particular operation (i.e. a read or a write) in order to, for example, calculate an operational queue length (block 1506). At block 1508, performance data related to the read and/or write request is recorded in a hash table. In some embodiments, the data may be indexed first by file system type and secondarily by mount point name. The file system function that was originally called is invoked, performing the specific action requested (block 1510). At block 1512, a second set of hook functions are called upon the completion of the file system read and/or write function. The second set of hook functions may record, e.g., the elapsed time taken to carry out the requested file system function and/or the size of data read or written.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the embodiments disclosed herein, and that modifications to the disclosed embodiments, as well as other embodiments, are intended to be included within the scope of the appended claims. The present invention is defined by the following claims.

What is claimed is:

1. A method for collecting storage resource performance data, the method comprising:

determining a location in the memory for a function dispatch table that is configured to store pointers to read and/or write functions corresponding to a file system;

modifying the function dispatch table to redirect a request for an operation;
recording, responsive to a received request for the operation, an intent to perform the operation to estimate an operational queue length;
recording, responsive to the received request for the operation, data associated with the operation in a hash table;
invoking, responsive to recording data associated with the operation, a function corresponding to the operation to perform the operation; and
recording elapsed time and storage size responsive to a received notification of completion of the operation,
wherein at least one of determining the location, modifying the function dispatch table, recording the intent to perform the operation, recording the data in the hash table, invoking the function, and recording elapsed time and storage size is performed using at least one data processor, and
wherein determining the location comprises resolving a kernel object symbol to extract the location.

2. The method according to claim 1, wherein the function dispatch table comprises a dynamically loaded vnode function dispatch table.

3. The method according to claim 1, wherein the operation comprises a read and/or a write operation.

4. The method according to claim 1, wherein the operation corresponds to memory mapped inputs and/or outputs.

5. The method according to claim 1, wherein modifying the function dispatch table to redirect a request for the operation comprises hooking the file system read and/or write functions.

6. The method according to claim 1, wherein recording the intent to perform the operation comprises using a first set of file system hook functions.

7. The method according to claim 6, wherein the particular operation includes calculating the operational queue length.

8. The method according to claim 1, after recording the data associated with the operation in the hash table, further comprising indexing the data recorded in the hash table by a file system type and/or by a mount point name.

9. The method according to claim 8, wherein indexing the data recorded in the hash table comprises primarily indexing the data by the file system type and secondarily indexing the data by the mount point name.

10. The method according to claim 1, wherein invoking the function corresponding to the operation to perform the operation comprises performing a specific action corresponding to the operation.

11. The method according to claim 1, the method further comprising:
modifying the function dispatch table to redirect a notification of completion of the operation,
wherein recording elapsed time and storage size is performed using a second set of file system hook functions, and
wherein elapsed time and storage size is recorded responsive to a received notification of completion of the operation.

12. A computer program product comprising:
a non-transitory computer readable storage medium having computer readable program code embodied therein, the computer readable program code comprising:
computer readable program code that is configured to modify a function dispatch table that is configured to store pointers to read and/or write functions corresponding to a file system to redirect a request for a read and/or a write operation;
computer readable program code that is configured to record an intent to perform the read and/or write operation to estimate an operational queue length in response to a received request for the read and/or write operation;
computer readable program code that is configured to record data associated with the operation in a hash table in response to the received request for the read and/or write operation;
computer readable code that is configured to invoke a function corresponding to the read and/or write operation to perform the read and/or write operation; and
recording an elapsed time and a storage size responsive to a received notification of completion of the operation,
wherein the location is determined by resolving a kernel object symbol to extract the location.

13. The computer program product according to claim 12, further comprising:
computer readable program code that is configured to modify the function dispatch table to redirect a notification of completion of the read and/or write operation,
wherein recording elapsed time and storage size is performed using a second set of file system hook functions, and
wherein elapsed time and storage size is recorded responsive to a received notification of completion of the read and/or write operation.

14. The computer program product according to claim 12, wherein the function dispatch table includes a dynamically loaded vnode function dispatch table.

15. The computer program product according to claim 12, wherein the read and/or write operation corresponds to memory mapped inputs and/or outputs.

16. The computer program product according to claim 12, wherein the function dispatch table is modified to redirect the request for the read and/or write operation by hooking file system read and/or write functions.

17. The computer program product according to claim 12, after the data associated with the read and/or write operation is recorded in the hash table, further comprising computer readable program code that is configured to index the data recorded in the hash table by a file system type and/or by a mount point name,
wherein the data recorded in the hash table is indexed by primarily indexing the data by the file system type and secondarily indexing the data by the mount point name.

18. The computer program product according to claim 12, wherein the intent to perform the read and/or write operation is performed using a first set of file system hook functions, and
wherein the particular read and/or write operation includes calculating the operational queue length.

19. The method according to claim 1, wherein elapsed time comprises an amount of time from receipt of the request for the operation to time of receipt of the notification of completion of the operation.

20. The computer program product according to claim 12, wherein elapsed time comprises an amount of time from receipt of the request for the operation to time of receipt of notification of completion of the operation.

* * * * *